US008139867B2

(12) United States Patent
Maxwell et al.

(10) Patent No.: US 8,139,867 B2
(45) Date of Patent: *Mar. 20, 2012

(54) IMAGE SEGREGATION SYSTEM ARCHITECTURE

(75) Inventors: Bruce Allen Maxwell, Benton, ME (US); Casey Arthur Smith, Grand Junction, CO (US); David Allen Tolliver, Pittsburgh, PA (US); James Andrew Bagnell, Pittsburgh, PA (US); Andrew Neil Stein, Pittsburgh, PA (US); Iljung Samuel Kwak, Pittsburgh, PA (US); Kristin Jean Dana, Spring Lake, NJ (US); Steven Joseph Bushell, Cranston, RI (US); Timothy King Rodgers, Jr., Concord, MA (US); Bartholomeus Christianus Leonardus Nabbe, Hillsboro, OR (US); Milan Diebel, Hillsboro, OR (US); Richard Mark Friedhoff, San Francisco, CA (US)

(73) Assignee: Tandent Vision Science, Inc., San Francisco, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 12/315,642

(22) Filed: Dec. 5, 2008

(65) Prior Publication Data

US 2010/0142825 A1 Jun. 10, 2010

(51) Int. Cl.
*G06K 9/48* (2006.01)
*G06K 9/00* (2006.01)

(52) U.S. Cl. ...................................... 382/199

(58) Field of Classification Search .................. 382/118, 382/159, 164, 167, 170, 173, 181, 182, 199, 382/254, 260, 266, 274, 282, 321
See application file for complete search history.

(56) References Cited

U.S. PATENT DOCUMENTS

| 5,495,536 | A | 2/1996 | Osbourn | 382/199 |
|---|---|---|---|---|
| 5,651,042 | A | 7/1997 | Dewaele | 378/62 |
| 5,774,112 | A | 6/1998 | Kasson | 345/153 |
| 6,061,091 | A | 5/2000 | Van de Poel et al. | 348/241 |
| 6,428,169 | B1 | 8/2002 | Deter et al. | 353/20 |
| 6,654,055 | B1 | 11/2003 | Park et al. | 348/242 |
| 6,718,063 | B1 | 4/2004 | Lennon et al. | 382/224 |
| 6,999,616 | B2 | 2/2006 | Nacken | 382/165 |
| 7,031,525 | B2 | 4/2006 | Beardsley | 382/199 |
| 7,672,530 | B2 * | 3/2010 | Friedhoff et al. | 382/266 |
| 7,747,079 | B2 * | 6/2010 | Dana et al. | 382/199 |
| 7,894,662 | B2 * | 2/2011 | Bushell et al. | 382/154 |
| 2002/0080148 | A1 | 6/2002 | Uchino | 345/629 |
| 2002/0176023 | A1 | 11/2002 | Hofflinger et al. | 348/645 |

(Continued)

OTHER PUBLICATIONS

Baba et al:"Shadow removal from real a real image based on shadow density," ACM SIGGRAPH 2004 Posters, Aug. 8-12, 2004, Los Angeles, 1 page.

(Continued)

*Primary Examiner* — Amir Alavi
(74) *Attorney, Agent, or Firm* — Davidson, Davidson & Kappel, LLC; Felix L. D'Arienzo, Jr.

(57) ABSTRACT

In an exemplary embodiment of the present invention, an automated, computerized method is provided for processing an image. According to a feature of the present invention, the method comprises the steps of generating spatio-spectral information for the image, defining a constraint as a function of the spatio-spectral information, and performing an optimization operation as a function of the constraint to generate an intrinsic image corresponding to the image.

24 Claims, 22 Drawing Sheets

U.S. PATENT DOCUMENTS

| | | | |
|---|---|---|---|
| 2003/0095704 A1 | 5/2003 | Risson | 382/162 |
| 2005/0117045 A1 | 6/2005 | Abdellatif et al. | 348/335 |
| 2005/0254709 A1* | 11/2005 | Geshwind et al. | 382/182 |
| 2006/0018539 A1 | 1/2006 | Sato et al. | 382/173 |
| 2006/0177137 A1 | 8/2006 | Friedhoff | 382/199 |
| 2006/0177149 A1 | 8/2006 | Friedhoff et al. | 382/274 |
| 2007/0176940 A1 | 8/2007 | Maxwell et al. | 345/589 |
| 2007/0176941 A1 | 8/2007 | Maxwell et al. | 345/589 |
| 2007/0177797 A1* | 8/2007 | Smith et al. | 382/164 |
| 2007/0242878 A1 | 10/2007 | Maxwell et al. | 382/168 |
| 2009/0034835 A1 | 2/2009 | Maxwell | 382/164 |
| 2010/0085452 A1* | 4/2010 | Hirakawa et al. | 348/273 |
| 2010/0142805 A1* | 6/2010 | Maxwell et al. | 382/164 |
| 2010/0142825 A1* | 6/2010 | Maxwell et al. | 382/199 |
| 2010/0278448 A1* | 11/2010 | Friedhoff et al. | 382/274 |
| 2010/0303348 A1* | 12/2010 | Tolliver et al. | 382/164 |
| 2011/0064263 A1* | 3/2011 | de Haan et al. | 382/100 |
| 2011/0064308 A1* | 3/2011 | Stein et al. | 382/170 |
| 2011/0170768 A1* | 7/2011 | Alldrin et al. | 382/159 |

OTHER PUBLICATIONS

Baba, et al:"Shadow removal from a real picture," Proceedings of the SIGGRAPH 2003 conference on Sketches & Applications, ACM Press, 1-1, 2003, 1 page.

Sato et al: Illumination distribution from brightness in shadows: adaptive distribution with unknown reflectance properties in shadow regions, In ICCV(2) 875-82, 1999.

Randen, T.[Trygve], Husøy, J.H.[John Håkon] "Filtering for Texture Classification: A Comparative Study," PAMI(21), No. 4, Apr. 1999, pp. 291-310.

P. Felzenszwalb and D. Huttenlocher "Distance Transforms of Sampled Functions," *Cornell Computing and Information Science Technical Report*. TR2004-1963, Sep. 2004.

Abdi, H. (2007), Z-scores, in N.J. Salkind (Ed.), Encyclopedia of Measurement and Statistics, Thousand Oaks, CA: Sage, pp. 1-4.

Peter J. Rousseeuw "Least Median of Squares Regression," *Journal of the American Statistical Association*, vol. 79, No. 388 (Dec. 1984), pp. 871-880.

Zvi Galil and Giuseppe F. Italiano "Data Structures and Algorithms for Disjoint Set Union Problems," *ACM Computing Surveys*, vol. 23, Issue 3 (Sep. 1991), pp. 319-344.

M. A. Fischler, R. C. Bolles "Random Sample Consensus: A Paradigm for Model Fitting with Applications to Image Analysis and Automated Cartography," *Comm. of the ACM*, vol. 24, pp. 381-395, 1981.

Varma et al.:"Texture Classification: Are Filter Banks Necessary?" Proceedings of the IEEE Conference on Computer Vision and Pattern Recognition, Jun. 2003, vol. 2, pp. 691-698.

Kobus Barnard and Graham Finlayson, "Shadow Identification using Colour Ratios," Proceedings of the IS&T/SID Eighth Color Imaging Conference: Color Science, Systems and Applications, 2000, 97-101.

K. Barnard, G.D. Finlayson and B. Funt, *Color Constancy for Scenes with Varying Illumination*, Computer Vision and Image Understanding, Feb. 1997, 65(2): 311-321.

H.G. Barrow and J.M. Tenenbaum, *Recovering Intrinsic Scene Characteristics from Image*, Computer Vision and Image Understanding, 1978, 2-26.

C.F. Borges, *A Trichromatic Approximation Method for Surface Illumination*, Journal of Optical Society of America, Aug. 1991, 8(8): 1319-1323.

M.S. Drew, G.D. Finlayson and S.D. Horley, *Recovery of Chromaticity Image Free From Shadows Via Illumination Invariance*, Proceedings of IEEE Workshop on Color and Photometric Methods in Computer Vision, Nice, France 2003.

G.D. Finlayson, M.S. Drew and L. Cheng, *Intrinsic Images by Entropy Minimization*, Proceedings of European Conference on Computer Vision, LNCS 3023, pp. 582-595, 2004.

G.D. Finlayson, S.D. Horley and M.S. Drew, *Removing Shadows From Images*, Proceeding of European Conference on Computer Vision, pp. 823-826, London, UK, 2002.

G.D. Finlayson, S.D. Horley and M.S. Drew, *On the Removal of Shadows From Images*, IEEE. Translation on Patter n Analysis and Machine Vision, 28(1): 59-68, 2006.

G.D. Funklea and R. Bajcsy, *Combining Color and Geometry for the Active, Visual Recognition of Shadows*, University of Pennsylvania Department of Computer & Information Science Technical Report No. MS-CIS-94-62, 2002.

R. Gershon, A.D. Jepson and J. K. Tsotsos, *Ambient Illumination and the Determination of Material Changes*, Journal of the Optical Society of America A, 3(10):1700-1707, 1986.

J.M. Geusebroek, R.v.d. Bommgard, A.W.M. Smeulders, *Color Invariance*, IEEE Trans. on Pattern Analysis and Machine Intelligence, 23(12):1338-1350, Dec. 2001.

G.E. Healey, *Using Color for Geometry-Insensitive Segmentation*, Journal of Optical Society of America A, 6(6):920-937, Jun. 1989.

B.K.P. Horn, *Determining Lightness from an Image*, Computer Graphics and Image Processing, 3(1):277-299, Dec. 1974.

G.J. Klinker, S.A. Shafer and T. Kanade, *A Physical Approach to Image Understanding*, Int'l Journal of Computer Vision, 4(1): 7-38, Jan. 1990.

E.H. Land and J.J. McCann, *Lightness and Retinex Theory*, Journal of Optical Society of America A, 61:1-11, 1971.

M.S. Langer, *When Shadows Become Interreflections*,, Int'l Journal of Computer Vision, 34(2/3), 193-204, 1999.

J.A. Marchant and C.M. Onyango, *Shadow-Invariant Classification for Scenes Illuminated by Daylight*, Journal of the Optical Society of America A, 17(11), Nov. 2000.

S.K. Nayar, K. Ikeuchi and T. Kanade, *Shape from Interreflections*, IEEE International Conference onn cOmputr Vision (ICCV), pp. 2-11, Dec. 1990.

I. Omer and M. Werman, *Color Lines: Image Specific Color Representation*, Proceeding of IEEE Conference on Computer Vision and Patter Recognition, pp. 946-953, Jun. 2004.

S.A Shafer, *Using Color to Separate Reflection Components*, Computer Science Department University of Rochester, TR 136, Apr. 1984.

S. Tominaga, *Surface Identification Using Dichromatic Reflection Model*, IEEE Transactions of Pattern Analysis and Machine Intelligence, 13(7), pp. 658-670, Jul. 1991.

S. Tominaga and N. Tanaka, *Estimating Reflection Parameters from a Single Color Image*, IEEE Comput. Graph. Appl., 20(5):58-66, 2000.

J.v.d. Weijer and C. Schmid, *Coloring Local Feature Extraction*, pp. 1-14, 2000.

Elena Salvador et al.:"Cast shadow segmentation using invariant color features," Computer Vision and Image Understanding 95 (2004) 238-259.

Florica Mindru et al:"Moment invariants for recognition under changing viewpoint and illumination," Computer Vision and Image Understanding 94 (2004) 3-27.

Marshall F. Tappen et al.:"Recovering Intrinsic Images from a Single Image," IEEE Transactions on Pattern Analysis and Machine Intelligence, vol. 27, No. 9, Sep. 2005, 14 pages.

Li Shen et al.:"Image Decomposition with Non-Local Texture Cues," IEEE Conference on Computer Vision and Patten Recognition, 2008, 7 pages.

U.S. Appl. No. 12/315,643, filed Dec. 15, 2008, Bruce Maxwell.

H. G. Barrow and J. M. Tenenbaum. Recovering intrinsic scene characteristics from images. In A. R. Hanson and E. M. Riseman, editors, Computer Vision Systems, pp. 3-26, New York, 1978. Academic Press.

Y.-C. Chung, J.-M. Wang, R. R. Bailey, S.-W. Chen, S.-L.Chang, and S. Cherng. Physics-based extraction of intrinsic images from a single image. In ICPR, pp. 693-696, 2004.

B. V. Funt, M. S. Drew, and M. Brockington. Recovering shading from color images. In ECCV, pp. 124-132, May 1992.

A. Olmos and F. A. A. Kingdom. A biologically inspired algorithm for the recovery of shading and reflectance images. Perception, 33:1463-1473, 2004.

L. Shen, P. Tan, and S. Lin. Intrinsic image decomposition with non-local texture cues. In CVPR, 2008.

M. F. Tappen, E. H. Adelson, and W. T. Freeman. Estimating intrinsic component images using non-linear regression. In CVPR, 2006.

M. F. Tappen, W. T. Freeman, and E. H. Adelson. Recovering intrinsic images from a single image. In NIPS, pp. 1367-1374, 2003.

M. F. Tappen, W. T. Freeman, and E. H. Adelson. Recovering intrinsic images from a single image. PAMI, 27(9):1459-1472, 2005.

Y. Weiss and W. T. Freeman. What makes a good model of natural images? In CVPR, 2007.

L. Xu, F. Qi, and R. Jiang. Shadow removal from a single image. In ISDA, vol. 2, 2006.

U.S. Appl. No. 12/315,643, filed Dec. 15, 2008.

* cited by examiner

Pixel Array for Storing Image Data

| P(1, 1) | P(1, 2) | • • • | | • • • | P(1, M) |
|---------|---------|-------|---|-------|---------|
| P(2, 1) | P(2, 2) | | | | ⋮ |
| P(3, 1) | P(3, 2) | | | | ⋮ |
| ⋮ | | | | | |
| ⋮ | | | | | ⋮ |
| P(N, 1) | • • • | | | • • • | P(N, M) |

Image File ⌐18

FIG. 2A

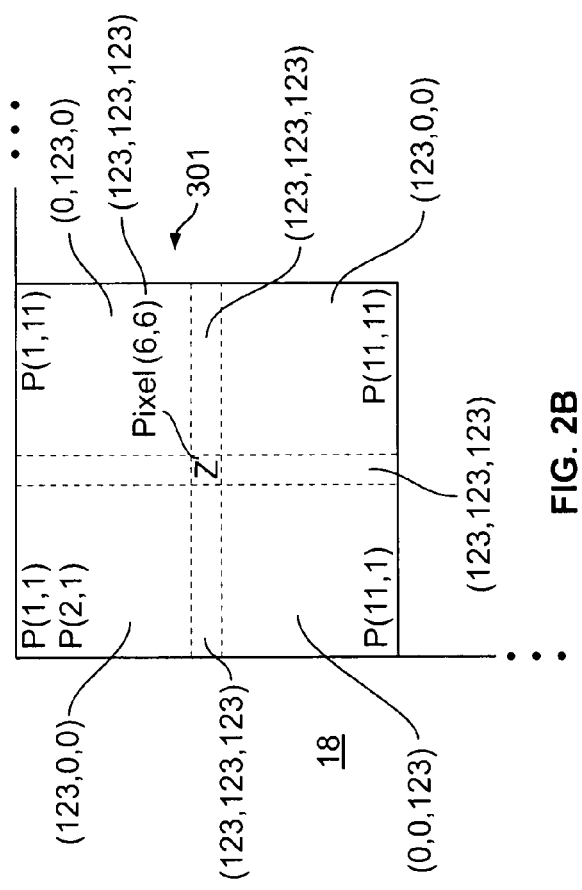

Examples of Identifying Token Regions in an Image

Original Image

- ⊗ Teal In Shadow
- ⊙ Teal
- ⊖ Blue In Shadow
- ⊘ Blue
- ⊖ Yellow

Token Regions

Type B Tokens

$$\begin{bmatrix} 0.00031426 & 0.002632078 & 0.008579021 & 0.012376362 & 0.008579021 & 0.002632078 & 0.00031426 \\ 0.002632078 & 0.017490147 & 0.039192701 & 0.043078559 & 0.039192701 & 0.017490147 & 0.002632078 \\ 0.008579021 & 0.039192701 & 0 & -0.096532354 & 0 & 0.039192701 & 0.008579021 \\ 0.012376362 & 0.043078559 & -0.096532354 & -0.318309892 & -0.096532354 & 0.043078559 & 0.012376362 \\ 0.008579021 & 0.039192701 & 0 & -0.096532354 & 0 & 0.039192701 & 0.008579021 \\ 0.002632078 & 0.017490147 & 0.039192701 & 0.043078559 & 0.039192701 & 0.017490147 & 0.002632078 \\ 0.00031426 & 0.002632078 & 0.008579021 & 0.012376362 & 0.008579021 & 0.002632078 & 0.00031426 \end{bmatrix}$$

FIG. 12B

| P(1,1) | P(1,2) | P(1,3) | P(1,4) | P(1,5) | P(1,6) | P(1,7) |
|---|---|---|---|---|---|---|
| P(2,1) | P(2,2) | P(2,3) | P(2,4) | P(2,5) | P(2,6) | P(2,7) |
| P(3,1) | P(3,2) | P(3,3) | P(3,4) | P(3,5) | P(3,6) | P(3,7) |
| P(4,1) | P(4,2) | P(4,3) | P(4,4) | P(4,5) | P(4,6) | P(4,7) |
| P(5,1) | P(5,2) | P(5,3) | P(5,4) | P(5,5) | P(5,6) | P(5,7) |
| P(6,1) | P(6,2) | P(6,3) | P(6,4) | P(6,5) | P(6,6) | P(6,7) |
| P(7,1) | P(7,2) | P(7,3) | P(7,4) | P(7,5) | P(7,6) | P(7,7) |

FIG. 12C

User Supplies an Image and Selects Which Constraints.
The Operators Process the Image Data.
The Constraint Generators Use the Operators to Create Individual Constraints.
The Constraints are Assembled into one Consistent Set and Passed to the Solver.
The Solver Produces the Intrinsic Components of the Input Image.

IMAGE SEGREGATION SYSTEM ARCHITECTURE

BACKGROUND OF THE INVENTION

A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object edge within an image has been a persistent challenge to scientists. An early and conventional approach to object edge detection involves an analysis of brightness boundaries in an image. In the analysis it is assumed that a boundary caused by a material object will be sharp, while a boundary caused by a shadow will be soft or gradual due to the penumbra effect of shadows. While this approach can be implemented by algorithms that can be accurately executed by a computer, the results will often be incorrect. In the real world there are many instances wherein shadows form sharp boundaries, and conversely, material object edges form soft boundaries. Thus, when utilizing conventional techniques for shadow and object edge recognition, there are significant possibilities for false positives and false negatives for shadow recognition. That is, for example, a material edge that imitates a shadow and is thus identified incorrectly by a computer as a shadow or a sharp shadow boundary that is incorrectly interpreted as an object boundary. Accordingly, there is a persistent need for the development of accurate and correct techniques that can be utilized in the operation of computers relating to images, to, for example, identify material and illumination characteristics of the image.

SUMMARY OF THE INVENTION

The present invention provides a method and system comprising image processing techniques that utilize spatio-spectral information relevant to an image to accurately and correctly identify illumination and material aspects of the image.

In a first exemplary embodiment of the present invention, an automated, computerized method is provided for processing an image. According to a feature of the present invention, the method comprises the steps of providing an image, generating spatio-spectral operators for the image, defining a constraint between the spatio-spectral operators, and performing an optimization operation as a function of the constraint to generate an intrinsic image corresponding to the image.

In a second exemplary embodiment of the present invention, an automated, computerized method is provided for processing an image. According to a feature of the present invention, the method comprises the steps of providing an image, organizing spatio-spectral information for the image in a matrix equation expressed by: $[A][x]=[b]$, wherein $[A]$ expresses values determined by a constraining relationship imposed upon the spatio-spectral information, $[b]$ expresses recorded information for the image, and $[x]$ expresses an unknown material/illumination component of the image, performing an optimization operation to determine a solution for the equation, and utilizing the solution to generate an intrinsic image corresponding to the image.

In a third exemplary embodiment of the present invention, a computer system is provided. The computer system comprises a CPU and a memory storing an image file containing an image. Pursuant to a feature of the present invention, the CPU is arranged and configured to execute a routine to generate spatio-spectral operators for the image, define a constraint between the spatio-spectral operators, and perform an optimization operation as a function of the constraint to generate an intrinsic image corresponding to the image.

In a fourth exemplary embodiment of the present invention, a computer system is provided. The computer system comprises a CPU and a memory storing an image file. Pursuant to a feature of the present invention, the CPU is arranged and configured to execute a routine to organize spatio-spectral information for the image in a matrix equation expressed by: $[A][x]=[b]$, wherein $[A]$ expresses values determined by a constraining relationship imposed upon the spatio-spectral information, $[b]$ expresses recorded information for the image, and $[x]$ expresses an unknown material/illumination component of the image, perform an optimization operation to determine a solution for the equation, and utilize the solution to generate an intrinsic image corresponding to the image.

In a fifth exemplary embodiment of the present invention, a computer system is provided. The computer system comprises a CPU and a memory storing an image file, a constraint generator library storing a plurality of constraint software modules, each one of the constraint software modules defining spatio-spectral information utilized by the respective one of the constraint software modules and an expression of a constraining relationship imposed upon the respective spatio-spectral information, a service provider, and a solver; wherein: the service provider operates to select a constraint software module from the plurality of constraint software modules, arrange spatio-spectral information relevant to the image as a function of the selected constraint software module, and input the arranged spatio-spectral information relevant to the image to the solver, the solver operates to perform an optimization operation as a function of the arranged spatio-spectral information relevant to the image, to generate an intrinsic image corresponding to the image.

In a sixth exemplary embodiment of the present invention, an automated, computerized method is provided for processing an image. According to a feature of the present invention, the method comprises the steps of generating spatio-spectral information for the image, defining a constraint as a function of the spatio-spectral information, and performing an optimization operation as a function of the constraint to generate an intrinsic image corresponding to the image.

In a seventh exemplary embodiment of the present invention, a computer system is provided. The computer system comprises a CPU and a memory storing an image file. Pursuant to a feature of the present invention, the CPU is arranged and configured to execute a routine to generate spatio-spectral information for the image, define a constraint as a function of the spatio-spectral information, and perform an optimization operation as a function of the constraint to generate an intrinsic image corresponding to the image.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programed to carry out the steps of the methods of the present invention.

BRIEF DESCRIPTION OF THE DRAWINGS

FIG. 2a shows an n×m pixel array image file for an image stored in the computer system of FIG. 1.

FIG. 2b is an 11×11 pixel array formed from the upper left hand corner of the image file of FIG. 2a, for use in the generation of an histogram, according to a feature of the present invention.

FIG. 2c shows a diagram of the histogram generated from the 11×11 pixel array of FIG. 2b.

FIG. 12b is an example of an LoG filter mask.

FIG. 12c is an illustration of a 7×7 pixel patch within the n×m pixel array image file of FIG. 2a.

DETAILED DESCRIPTION OF THE PREFERRED EMBODIMENTS

Figure 1:
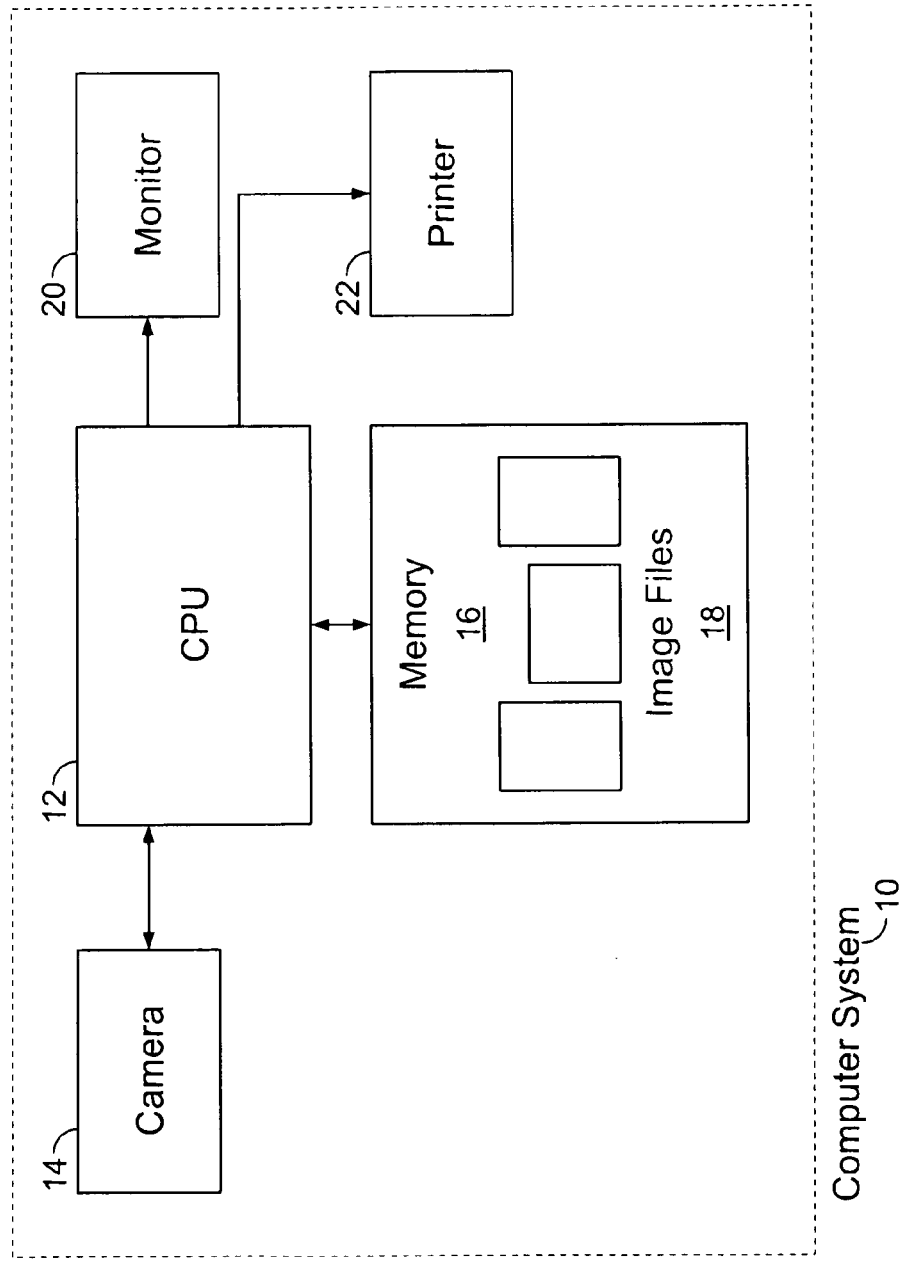
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2a, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electromagnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a segregation of illumination and material aspects of a scene depicted in an image of the image file 18 to provide an intrinsic image. The intrinsic image can comprise a material image and/or an illumination image corresponding to the original image, for improved processing in such applications as computer vision. A fundamental observation underlying a basic discovery of the present invention, is that an image comprises two components, material and illumination. All changes in an image are caused by one or the other of these components. Spatio-spectral information is information relevant to contiguous pixels of an image depicted in an image file 18, such as spectral relationships among contiguous pixels, in terms of color bands, for example RGB values of the pixels, and the spatial extent of the pixel spectral characteristics relevant to a characteristic of the image, such as, for example, a single material depicted in the image or illumination flux effecting the image.

What is visible to the human eye upon display of a stored image file 18 by the computer system 10, is the pixel color values caused by the interaction between specular and body reflection properties of material objects in, for example, a scene photographed by the digital camera 14 and illumination flux present at the time the photograph was taken. The illumination flux comprises an ambient illuminant and an incident illuminant. The incident illuminant is light that causes a shadow and is found outside a shadow perimeter. The ambient illuminant is light present on both the bright and dark sides of a shadow, but is more perceptible within the dark region. Pursuant to a feature of the present invention, the computer system 10 can be operated to differentiate between material aspects of the image such as, for example, object edges, and illumination flux through recognition of a spectral shift caused by the interplay between the incident illuminant and the ambient illuminant in the illumination flux.

When one of material and illumination is known in an image, the other can be readily deduced. The spectra for the incident illuminant and the ambient illuminant can be different from one another. Thus, a spectral shift is caused by a shadow, i.e., a decrease of the intensity of the incident illuminant. Pursuant to a feature of the present invention, spectral shift phenomena is captured in spatio-spectral information. The spatio-spectral information includes a spectral ratio: a ratio based upon a difference in color or intensities between two areas of a scene depicted in an image, which may be caused by different materials (an object edge), an illumination change (illumination boundary) or both. In a preferred embodiment of the present invention, the spectral ratio equals Dark/Bright-Dark, where Dark is the color band values (e.g. RGB color values) at a point at an illumination boundary, in a shadowed region of the image, and Bright is the color band values at a point on the illuminated side of the same illumination boundary.

Inasmuch as an illumination boundary is caused by the interplay between the incident illuminant and the ambient illuminant, spectral ratios throughout the image that are associated with illumination change, should be consistently and approximately equal, regardless of the color of the bright side or the material object characteristics of the boundary. A spectral ratio corresponding to an illumination boundary can be designated as a characteristic illuminant ratio for the image.

According to a further feature of the present invention, spatio-spectral operators are generated to facilitate a process for the segregation of illumination and material aspects of a scene depicted in an image file 18. Spatio-spectral operators comprise representations or characteristics of an image that encompass spatio-spectral information usable in the processing of material and illumination aspects of an image. The spatio-spectral operators are subject to constraints that define constraining spatio-spectral relationships between the operators, for input to a solver. The solver includes a mathematical processing engine that operates to obtain an optimized solution for the generation of an intrinsic image, such as a material image and/or an illumination image derived from the original image stored in an image file 18, as a function of the constraining relationships between the spatio-spectral operators.

Spatio-spectral operators include, for example, tokens, token map information, log chromaticity representation values, X-junctions, BIDR model representations, a boundary representation, and a texton histogram based pixel representation.

Pursuant to a feature of the present invention, a token is a connected region of an image wherein the pixels of the region are related to one another in a manner relevant to identification of image features and characteristics such as identification of materials and illumination. The use of tokens recognizes the fact that a particular set of material/illumination/geometric characteristics of an image extends beyond a single pixel, and therefore, while the image processing described herein can be done on a pixel level, tokens expedite a more efficient processing of image properties. The pixels of a token can be related in terms of either homogeneous factors, such as, for example, close correlation of color values among the pixels, or nonhomogeneotis factors, such as, for example, differing color values related geometrically in a color space such as RGB space, commonly referred to as a texture. Exemplary embodiments of the present invention provide methods and systems to identify various types of homogeneous or nonhomogeneous tokens for improved processing of image files. The present invention utilizes spatio-spectral information relevant to contiguous pixels of an image depicted in an image file 18 to identify token regions.

According to one exemplary embodiment of the present invention, homogeneous tokens are each classified as either a Type A token, a Type B token or a Type C token. A Type A token is a connected image region comprising contiguous pixels that represent the largest possible region of the image encompassing a single material in the scene. A Type B token is a connected image region comprising contiguous pixels that represent a region of the image encompassing a single material in the scene, though not necessarily the maximal region corresponding to that material. A Type C token comprises a connected image region of similar image properties among the contiguous pixels of the token, for example, similar color and intensity, where similarity is defined with respect to a noise model for the imaging system used to record the image.

A linear token is a nonhomogeneous token comprising a connected region of the image wherein adjacent pixels of the region have differing color measurement values that fall within a cylinder in RGB space, from a dark end (in shadow) to a bright end (lit end), along a positive slope. The cylinder configuration is predicted by a bi-illuminant dichromatic reflection model (BIDR model), according to a feature of the present invention, when the color change is due to an illumination change forming a shadow (i.e. a decrease in the intensity of the incident illuminant as the interplay between the incident or direct illuminant and the ambient illuminant in the illumination field) over a single material of a scene depicted in the image.

For purposes of describing, identifying and using linear tokens, the BIDR model can be stated as: $I_{(x, y, z, \theta, \phi, \lambda)} = c_b(\lambda) I_d(\lambda) \gamma_b + M_a(\lambda) c_b(\lambda)$, where: $I_{(x, y, z, \theta, \phi, \lambda)}$ is the radiance of a surface point at (x, y, z) in the direction $\theta$, $\phi$ for the wavelength $\lambda$, $c_b(\lambda)$ is the geometry independent body reflectance of a surface for the wavelength $\lambda$, $I_d(\lambda)$ is the incident illuminant for the wavelength $\lambda$. $\gamma_b$ is the product of a shadow factor $s_{x, y, z}$ and a geometric factor $m_b(\theta_i)$, and $M_a(\lambda)$ is the integral of the ambient illuminant and geometric body reflectance over a hemisphere, excluding the incident illuminant. For more detailed information on the BIDR model, reference should be made to U.S. application Ser. No. 11/341,751, filed Jan. 27, 2006, entitled: "Bi-illuminant Dichromatic Reflection Model For Image Manipulation," published as US 2007/0176940 on Aug. 2, 2007.

Token map information indicates locations of tokens within an image, relative to one another. The map information is used to identify neighboring tokens for performing an analysis of token neighbor relationships relevant to constraining spatio-spectral relationships between tokens, for input to the solver.

Log chromaticity representation values provide illumination invariant values for pixels of the image. Logarithmic values of the color band values of the image pixels are plotted on a log-color space graph. The logarithmic values are then projected to a log-chromaticity projection plane oriented as a function of the BIDR model. The chromaticity plane values are substituted for the color band values (for example, RGB values) of each pixel. For more detailed information on log chromaticity representation values, reference should be made to U.S. application Ser. No. 11/403,719, filed Apr. 13, 2006, entitled: "Method And System For Separating Illumination And Reflectance Using a Log Color Space," published as US 2007/0242878 on Oct. 18, 2007.

An X-junction is an area of an image where a material edge and an illumination boundary-cross one another. An X-junction is an optimal location for an accurate analysis of material and illumination aspects of an image.

A boundary representation is an arrangement of pixels, on each side of a boundary, formed by, for example, adjacent Type B tokens. The arrangement is used to facilitate an analysis of the boundary to classify the boundary as a material boundary on a smooth surface (as opposed to another type of boundary, for example, an illumination edge, depth boundary or simultaneous illumination and material change). The pixel representation is configured to provide samples of pixels within each of the Type B tokens forming the boundary. The pixels of the samples are subject to spatio-spectral analysis, and the results are compared to determine the likelihood that the respective. boundary corresponds to a material change.

A texton is a homogeneous representation for a region of an image that comprises a texture. Image texture can be defined as a function of spatial variation in pixel intensities. Image texture patterns are frequently the result of physical or reflective properties of the image surface. Commonly, an image texture is associated with spatial homogeneity and typically includes repeated structures, often with some random variation (e.g., random positions, orientations or colors). Image textures are also often characterized by certain visual properties such as regularity, coarseness, contrast and directionality. An example of image texture is the image of a zebra skin surface as it appears to be spatially homogenous and seems to contain variations of color intensities which form certain repeated patterns. Some image textures can be defined by geometric characteristics, such as stripes or spots. A texton based operator transforms patterns of differing reflectance caused by a textured material into a homogeneous representation that captures the spectral and spatial characteristics of the textured region in the image.

Constraints comprise, for example, an anchor constraint, a same illumination constraint, a smooth illumination constraint, a Type B token constraint, a Linear token constraint, a BIDR enforcement constraint, a same texton histogram constraint, a log chromaticity similarity constraint, an X junction constraint, and a boundary representation constraint. Each constraint is configured as a constraint generator software module that defines the spatio-spectral operators utilized by the respective constraint and provides an expression of the constraining relationship imposed upon the constituent operators.

An anchor constraint utilizes a number of brightest/largest Type C tokens in an image. The constraining relationship is that the material of the selected brightest/largest Type C tokens is constrained to be an absolute value for the color/brightness observed in the image. The constraint anchors a material map for the image at an absolute brightness to avoid relative brightness constraints.

A same illumination constraint utilizes Type C tokens and Type B tokens identified in an image and token map information. The constraining relationship is that adjacent Type C tokens, as indicted by the token map information, are at the same illumination, unless the adjacent Type C tokens are part of the same Type B token. The term "same" in connection with the term "illumination" is used to mean an average value with respect to a noise model for the imaging system used to record the image. This constrains any observed differences in appearance between adjacent Type C tokens, that are not part of the same Type B token, to be a material change, as will appear.

A smooth illumination constraint is similar to the same illumination constraint. However, rather than constraining all pixels of adjacent Type C tokens to be of the same illumination, as in the same illumination constraint, in the smooth illumination constraint, the constraint is based upon the average illumination of the pixels near a shared boundary between adjacent Type C tokens. This constrains the illumination field to be somewhat smooth, as opposed to piecewise constant (the same, as defined above) throughout a token.

A Type B token constraint also utilizes Type C tokens and Type B tokens. However, the constraining relationship is that all Type C tokens that are part of the same Type B token are constrained to be of the same material. This constraint enforces the definition of a Type B token, that is, a connected image region comprising contiguous pixels that represent a region of the image encompassing a single material in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Accordingly, the Type B token constraint is complementary to the same and smooth illumination constraints, which, as opposed to illumination change, constrain observed differences to correspond to material change, as described above. This is due to the fact that in each of the same and smooth illumination constraints, Type C tokens that are adjacent and not part of the same Type B token, are constrained to the same illumination. These Type C tokens should comprise different materials, since by the constraint, they are not in the same Type B token and therefore, by the definition of Type B tokens enforced by the constraint, do not encompass a single material, so illumination should be a constant, and any observed difference is considered as attributable to a material change.

To summarize, pursuant to a feature of the present invention, the Type C and Type B token spatio-spectral operators are defined to provide characteristics of an image that enable segregation of illumination and material. Type C tokens each comprise a connected image region of similar image properties, for example similar color, as recorded and stored in an image file 18. Thus, adjacent Type C tokens indicate some form of change in the image or else they would form the same Type C token. Type B tokens encompass a single material. The complementary constraints of the same/smooth illumination constraints and the Type B token constraint enforce relationships between the tokens that indicate either a material change or an illumination change.

If the adjacent Type C tokens are within the same type B token, as in the Type B token constraint, the differences between them should correspond to illumination change due to the same material property of the common Type B token. If the adjacent Type C tokens are not within the same Type B token, as in the same/smooth illumination constraints, the difference between them should then correspond to a material change since they are not both defined by a common, single material Type B token.

A Linear token constraint utilizes Type C tokens and Linear tokens. The constraining relationship is that a difference between two Type C tokens, spaced by a Linear token, approximately equals a characteristic illuminant spectral ratio for the image. As defined, a Linear token follows a cylinder configuration along a positive slope, through color space. The BIDR model predicts that the positive slope equals a characteristic illuminant spectral ratio for the image. Thus, the color difference between two Type C tokens, one at each of the dark end and bright end of a Linear token, should reflect the value of the respective characteristic illuminant spectral ratio for the image.

A BIDR enforcement constraint utilizes Type C tokens and a BIDR model defined normal vector for the log-chromaticity projection plane. The constraining relationship is that the illumination for all Type C tokens in a local patch of the image forms a set of parallel lines in log-color space, the orientation of the parallel lines being defined by the BIDR model defined normal vector. The constraint therefore enforces the illumination field present in the image to explicitly fit the BIDR model prediction for the illumination.

Thus, each of the Linear token constraint and the BIDR enforcement constraint utilize BIDR model predictions as a basis to segregate illumination and material aspects of an image. The BIDR model predicts a color change in an image when the color change is due to an illumination change forming a shadow (i.e. a decrease in the intensity of the incident illuminant as the interplay between the incident or direct illuminant and the ambient illuminant in the illumination field) over a single material of a scene depicted in the image. The color change prediction of the BIDR model accurately constrains all color band variations among Type C tokens to illumination field effects occurring in an image by operating as a function of the interplay between the spectral variations occurring between incident illuminant and ambient illuminant components of the illumination field. Thus, BIDR model based constraints couple all color band variations into one integral constraining relationship.

A same texton histogram constraint utilizes Type C tokens and texton histogram operators identified for texture regions within an image. A texton analysis is utilized wherein each pixel of the image (or pixels of those regions of an image identified as comprising a texture) from the recorded color band representation of the respective image file 18, such as, for example, RGB color band values, is converted to a two band representation wherein the two bands comprise a texton label and a texton histogram label. The two band representations are then used to identify texture tokens, as will be described below. A constraint can be imposed that all Type C tokens within the same texture token are of the same mean material.

A log chromaticity similarity constraint utilizes Type C tokens and log chromaticity representation values. The constraining relationship is that those Type C tokens having pixels with similar log chromaticity representation values are constrained to a same color value, with observed differences being attributed to variations in the illumination field.

An X-junction constraint utilizes Type C tokens and X-junction operators. As noted above, an X-junction is an area of an image where a material edge and an illumination boundary cross one another. X-junctions are typically identified by four Type C tokens, two pairs of same material Type C tokens forming the material edge, with each same material pair including an illumination boundary dividing the respective same material into lit and shadowed pairs of Type C tokens. The constraining relationship: 1) a Type B token constraint is imposed between each same material pair of Type C tokens forming the X-junction (those with an illumination boundary between them), and 2) a same illumination constraint is imposed between each pair of Type C tokens forming the material edge of the X-junction. For a more detailed description of X-junctions and the relationships of constituent tokens, reference should be made to U.S. application Ser. No. 11/341,742, filed Jan. 27, 2006, entitled: "Method And System For Identifying Illumination Flux In An Image," published as US 2006/0177149 on Aug. 10, 2006.

A boundary representation constraint is defined by a standard ratio constraint. The analysis performed on a boundary representation, when indicating a material change, provides an estimate of the ratio of colors between two adjacent regions defined by the boundary, for example, the adjacent Type B tokens, even when the illumination varies over the regions. The constraint states that the ratio of the colors of two adjacent regions is X. The boundary representation analysis is executed at the level of Type B tokens, to classify a boundary as being caused by a material change, then propagated down to the level of the constituent Type C tokens. The constraint states that all adjacent pairs of Type C tokens along the boundary, (one Type C token on each side of the boundary, and all of the Type C tokens being within the Type B tokens forming the respective boundary), have colors that satisfy the ratio X, as indicated by the boundary representation analysis.

According to a preferred embodiment of the present invention, each of the above described constraints can be classified into one of three basic types of constraints, an absolute material color constraint, a same material constraint and a relative reflectance constraint. The absolute material constraint constrains the material at a particular location of an image to be a certain color, as implemented in, for example, the anchor constraint. The same material constraint constrains operators relevant to an image (for example, two pixels or Type C tokens) to be of the same material. The same material type of constraint can be implemented in, for example, Type B, X-junction, log chromaticity similarity, same texton histogram and linear token constraints. The relative reflectance constraint constrains operators relevant to an image (for example, two pixels or Type C tokens) to have a similarity of reflectance characteristics, such as defined by smooth illumination and same illumination constraints, and which can be specified by X-junction, and boundary representation constraints.

An exemplary solver according to a feature of the present invention comprises a mathematical processing engine for executing an optimizing function, for example, optimization of results in an equation expressed by: [A] [x]=[b], where [A] is a matrix of values that are to be satisfied by (and therefore, taken as solved for by) the definitions of the operator(s) and the constraining relationship(s) for the operator(s), as indicated by selected constraint(s), [x] is a matrix of variables for which the equation is finding an optimal solution, for example, one of an illumination or material component of an image component, for example, a pixel or token, and [b] is a matrix of values observed in an image selected for processing, for example, the recorded values for the RGB color bands of each pixel of an image file 18. The optimizing equation can be implemented in a mathematical optimizing function selected from a set of known optimization solvers such as, for example, known convex optimization operations such as a least squares solver, or a preconditioned conjugate gradient solver.

According to a further feature of the present invention, factors including bounds, are introduced in a solver operation, in addition to constraining relationships, as a function of real world illumination and material phenomena, to keep material/illumination values within physically plausible ranges, such as a limit1, limit infinity solver ($L_1$, $L_\infty$), a bounded least squares solver, or a bounded $L_1$, $L_\infty$ solver, as will be described below.

Figure 3:
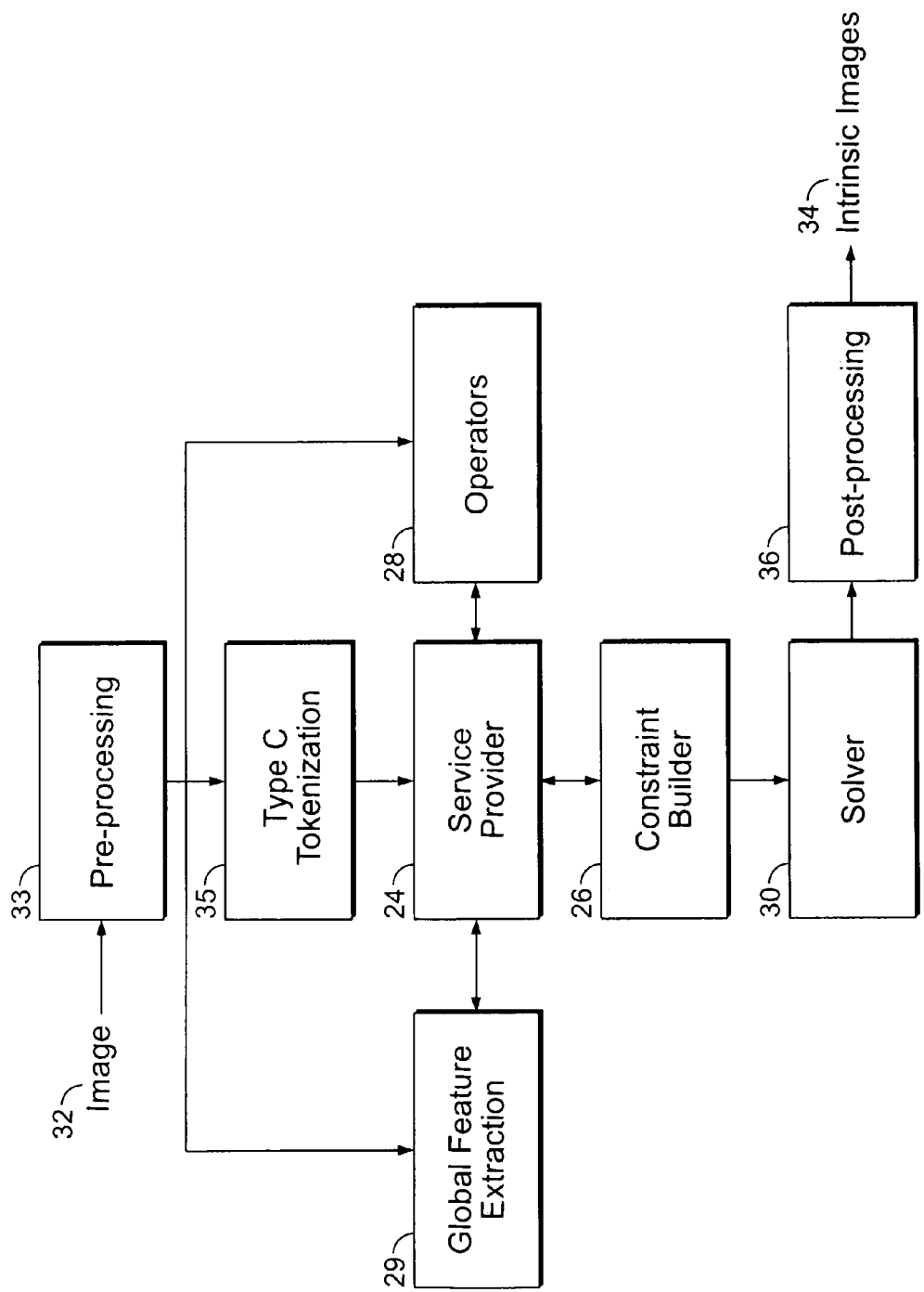
FIG. 3 is a functional block diagram of an image segregation system architecture, implemented in the computer system of FIG. 1, according to a feature of the present invention.

FIG. 3 shows a functional block diagram of an image segregation system architecture, implemented in, for example, the computer system of FIG. 1, according to a feature of the present invention. Alternatively, the functional blocks of FIG. 3 can be implemented in a dedicated hardware circuit arranged to perform the functionality of the blocks of FIG. 3. An image 32 (as depicted in an image file 18) is input to a preprocessing block 33. The preprocessing block 33 can perform such functions as correction of chromatic aberration in the image 32, combining multiple images to provide a high dynamic range image, linearize pixel data for the image, and so on, for an image optimized for processing. The pre-processed image is then input to a Type C tokenization block 35 which operates to identify Type C tokens in the pre-processed image, in the manner described below. Type C tokens are common to many of the constraints utilized in exemplary embodiments of the present invention, thus, an initial identification of Type C tokens for an input image 32 expedites further processing.

In an exemplary embodiment of the present invention, the CPU 12 executes code to implement both the preprocessing block 33 and the Type C tokenization block 35, as well as a service provider 24, that functions as a central agent and caching structure (configured in the memory 16), to handle an image for processing according to the teachings of the present invention. The service provider 24 receives and stores the pre-processed image and related Type C token information from the Type C tokenization block 35, and is coupled to an operators block 28 (executed by the CPU 12) arranged to generate any other operators for the image required by selected constraints, as will appear. The service provider 24 is also coupled to a global features extraction input 29. The global features extraction input 29 can be used to provide the system with information relevant to an image being processed, such as an indication of light source when the image was taken (sunlight, fluorescent light, incandescent light), time of day, location, domain knowledge, such as information relevant to the nature of the image, such as interior, exterior, buildings, lawns with green grass, trees with leaves in bloom, etc., and any other parameters relevant to image processing. The service provider 24 stores the global features extraction input 29 with a related input image 32.

A constraint builder 26 is coupled to the service provider 24. The constraint builder 26 uses a constraint generator library (configured within the memory 16) that stores the constraint generator software modules for the various constraints described above. The service provider 24 and constraint builder 26 operate to arrange spatio-spectral operators relevant to the pre-processed image, according to selected ones of the constraint generator software modules, in for example, the [A] [x]=[b] matrix equation.

A solver 30 (executed by the CPU 12) is coupled to the constraint builder 26, and implements an optimization operation, as described above, for an optimal solution for the [A] [x]=[b] matrix equation, for use in generating intrinsic images from the pre-processed image. The solver 30 is also coupled to a post-processing block 36 (executed by the CPU 12) for certain post-processing operations. The post-processing operations can include, for example, monotonicity maintenance. In monotonicity maintenance, if two large regions exhibit a linear transition in the input image 32, the transition should remain a linear transition in the output intrinsic image 34. Post-processing can also include illumination propagation, that serves to fill in holes left by the solver 30, illumination-map based white balancing and other filtering, smoothing processes. The post-processing block 36 outputs intrinsic images 34.

Figure 4:
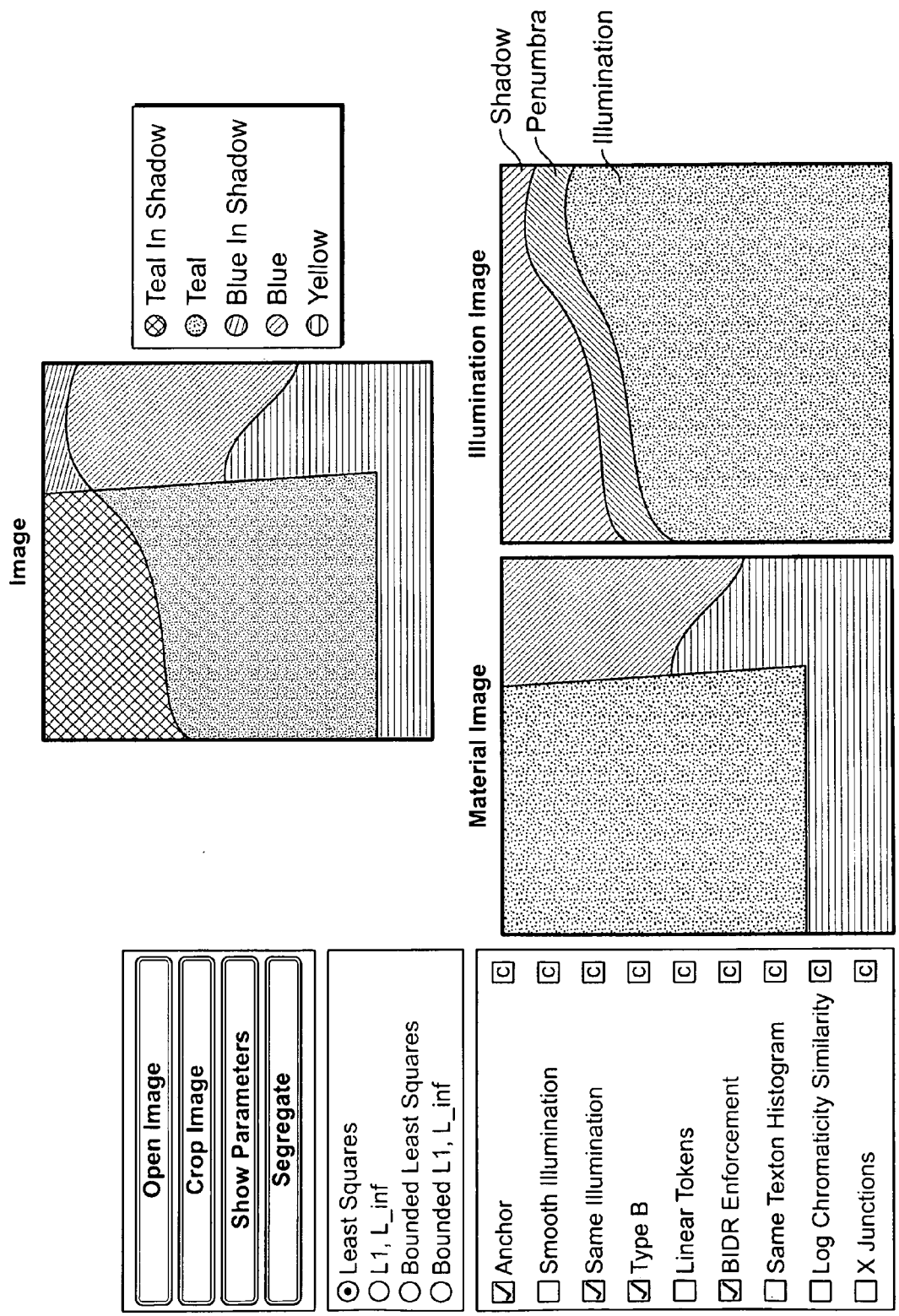
FIG. 4 shows a graphical user interface for use in connection with an implementation of the image segregation system architecture feature of the present invention.

Referring now to FIG. 4, there is shown a graphical user interface (GUI) for use in connection with an exemplary implementation of the image segregation system architecture feature of the present invention. The GUI of FIG. 4 is displayed on the monitor 20 of the computer system 10 by the service provider 24 for a user to select a desired image segregation operation. The upper left hand corner of the GUI indicates Open Image, Crop Image, Show Parameters, and Segregate selection indicators. A user can move and click a cursor on a desired selector indicator. The Open Image indicator lists all image files 18 currently stored in the memory 16 and enables the user to select an image for processing. The selected image is input 32 (see FIG. 3) to the service provider 24 (via the preprocessing block and the Type C tokenization block 35) which operates to display the selected image at the upper center of the monitor 20.

A material image derived by operation of the exemplary segregation system from the selected image is output 34 (see FIG. 3) after execution of the image segregation processing by the solver 30 and displayed at the lower right hand of the monitor 20 (FIG. 4). The derived illumination image is displayed at the lower right hand of the monitor 20.

According to a feature of the present invention, the Crop Image selector permits a user to crop a selected image so as to process a portion of the overall image. The Show Parameter selector displays parameters related to the selected image file 18. Parameters for each image file 18 can be stored in a parameter data file associated with a corresponding image file 18, and include any parameters relevant to the processing of the image depicted in the associated image file 18, for example the global features extraction input 29. Parameters can include any data relevant to image processing such as, for example, any variable for pixel analysis by the CPU 12, as for example, in the generation of spatio-spectral operators, and domain knowledge, such as information relevant to the nature of the image, such as interior, exterior, buildings, lawns with green grass, trees with leaves in bloom, etc.

Below the selection indicators is a list of each of the optimizing functions that can be used as the solver 30, and a further list of each of the constraint generators contained in the constraint generator library of the constraint builder 26. A user selects a desired mathematical operation and one or more of the constraints to be imposed upon the selected image. After selection of the image to be processed, the constraints to be imposed and the mathematical operation to be executed, the user can click on the Segregate indicator to commence image segregation processing.

Upon commencement of the image segregation processing, the service provider 24 retrieves the constraint generator software modules for the selected constraints to identify the spatio-spectral operators utilized by the selected constraints. Any spatio-spectral operators not already stored by the service provider 24 are generated by the operators block 28, for the image being segregated, and the service provider 24 caches the results. The cached results can be reused in any subsequent operation for a selected image, with the same set of associated parameters.

For example, if the selected constraint is a same illumination constraint, the service provider 24 identifies Type C tokens, Type B tokens and a token map for the selected image. The Type C tokens were generated by the Type C tokenization block 35. The service provider 24 operates the operators block 28 to generate the remaining operators specified by the same illumination constraint.

Figure 5A:
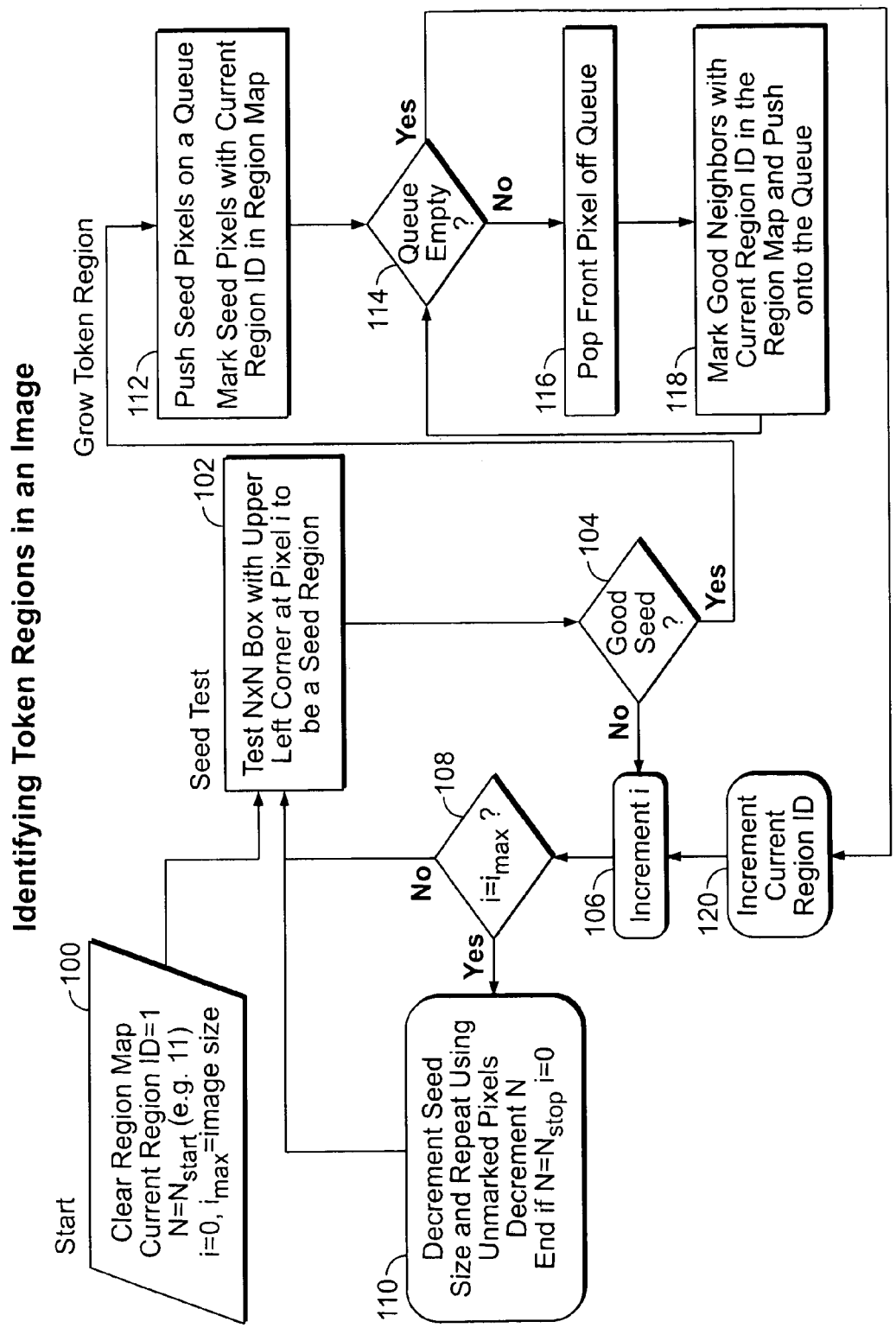
FIG. 5a is a flow chart for identifying Type C token regions in the image file of FIG. 2a, according to a feature of the present invention.

Referring now to FIG. 5a, there is shown a flow chart for generating Type C token regions in the image file of FIG. 2a, according to a feature of the present invention. Type C tokens can be readily identified in an image by the Type C tokenization block 35, utilizing the steps of FIG. 5a. The operators block 28 can then analyze and process the Type C tokens to construct Type B tokens when specified by a selected constraint, as will appear.

Prior to execution of the routine of FIG. 5a, the CPU 12 can operate to filter the image depicted in a subject image file 18. The filters may include an image texture filter, to, for example, transform patterns of differing reflectance caused by a textured material into a homogeneous representation that captures the spectral and spatial characteristics of the textured region in the image. Identification of Type B tokens can be difficult in an image texture. A textured image contains materials with, for example, more than one reflectance function that manifests as a defining characteristic. For example, the defining characteristic can be a pattern of colors within the texture, such that the texture displays a certain distribution of colors in any patch or region selected from anywhere within the textured region of the image.

In many instances, the texture filters may only be required on part of an input image, as much of the image may include homogeneously colored objects. Therefore, prior to application of the texture filters, it is useful to identify and mask off regions of homogeneous color. The texture filters are then only applied to areas where there appear to be textured materials. An example algorithm for identifying textured regions is as follows:

1) Execute a type C tokenization on the N-band color values (e.g. RGB), storing the token results in a region map R, where each pixel in the region map has the token ID of the token to which it belongs (see description of FIG. 5a).

2) Execute a median filter on the region map R (e.g. each pixel $P\_ij$ is replaced by the median token ID of a 7×7 box around $P\_ij$). Store the result in R-median.

3) Execute a filter on the original image that calculates the standard deviation of the pixels in a box around each pixel (e.g. 7×7) for each color band. Put the result in S.

4) For each pixel in S, divide the standard deviation calculated for each color band by an estimated noise model value. An example noise model is Sn=A*maxValue+B*pixelValue, where maxValue is the maximum possible color band value, pixelValue is the intensity of a particular band, and A and B are constants experimentally determined for the imaging system (e.g. A=0.001 and B=0.06 are typical). This step converts the standard deviation into a normalized deviation for each color band. Store the results in Sn.

5) For each pixel in Sn, sum the squares of the normalized deviations for all N color bands, take the square root of the result and divide by the number of bands N to create a deviation value $D\_ij$. Compare the resulting deviation value $D\_ij$ to a threshold (e.g. 1.0) assign a 1 to any pixel with a deviation value higher than the threshold, otherwise assign the pixel a 0. Store the results in a texture mask image T.

6) For each pixel in T, if the texture mask value $T\_ij=1$ and the seed size of the token region with the id given in the median region map $R\text{-median}\_ij$ is less than a threshold (e.g. <4), label the pixel as a textured pixel. Otherwise, label it as a homogeneous pixel. Store the result in the texture mask Tmask.

The output of the above algorithm is a mask, Tmask, which is an array of the size of the original image file 18 (n, m). Pixels (p(n, m)) having a corresponding Tmask location in the array with a 1 value should be treated as part of an image region corresponding to texture materials and pixels with a corresponding Tmask array location having a value of 0 should be treated as part of an image region corresponding to materials of homogeneous color.

The CPU 12 can execute a software module that implements any well known method handling textures, such as, for example, a Laws filter bank, or wavelets (see, for example, Randen, T.[Trygve], Huscøy, J. H. [John Håkon], Filtering for Texture Classification: A Comparative Study, PAMI(21), No. 4, April 1999, pp. 291-310). See also: Are Filter Banks Necessary? Proceedings of the IEEE Conference on Computer Vision and Pattern Recognition, June 2003, volume 2, pages 691-698.

In one exemplary embodiment of the present invention, Type C tokens are generated using an intensity histogram representation for each pixel of an image (or, preferably, for pixels of the image in regions identified as comprising a texture). The Type C tokens generated using intensity histograms are then used to generate Type B tokens. An intensity histogram representation for each pixel in a texture filter output image can be produced using the following algorithm:

A) Loop through all memory addresses/indexes in the Tmask array (n, m);
B) At each memory address/index of the Tmask array determine whether the value at each location is 1 or 0;
C) If a memory address/index of the Tmask has a 1 value indicating texture:
   a. Open the corresponding memory address/index in the corresponding image file 18 p(n, m) and access that memory address/index;
   b. Open that memory address/index for writing data;
   c. Initialize N 8-bin histograms to zero, one for each color band;
   d. For each pixel q within a neighborhood of p (for example, an 11×11 pixel array):
   For each of the N color values Cn of q (e.g. RGB wherein each color value is set between 0-255);
     (i) If N color value is between 0 and 31, then increment the first bin in 8-bin histogram of color N;
     (ii) If N color value is between 32 and 64, then increment the second bin in 8-bin histogram of color N;
     (iii) If N color value is between 65 and 97, then increment the third bin in 8-bin histogram of color N;
     (iv) If N color value is between 98 and 130, then increment the fourth bin in 8-bin histogram of color N;
     (v) If N color value is between 131 and 163, then increment the fifth bin in 8-bin histogram of color N;
     (vi) If N color value is between 164 and 196, then increment the sixth bin in 8-bin histogram of color N;
     (vii) If N color value is between 197 and 229, then increment the seventh bin in 8-bin histogram of color N;

(viii) If N color value is between 230 and 255, then increment the eighth bin in 8-bin histogram of color N;
e. Concatenate the N 8-bin histogram values together into a single intednsity histogram comprising an 8×N element vector;
f. Assign the 8×N element vector to the corresponding pixel p in the image file array p(n, m);
g. If current or next memory address/index is not last/Tmask (n, m), then move on to the next memory address/index in Tmask (n, m) array and execute step B;
h. If current memory address/index is last/equal to Tmask (n, m), then cease looping through Tmask (n, m) array.

D) If a memory address/index has a 0 value:
i. If current address/index is not a last element in Tmask (n, m) array, then move on to the next memory address/index in Tmask (n, m) array and execute step B;
ii. If current memory address/index location is a last element in Tmask (n, m) array, then cease looping through Tmask (n, m) array.

After the transformation for each pixel in the textured region of the image from a set of color bands, for example RGB, to an intensity histogram vector comprising a set of filter outputs, for example the 8×N concatenation, the image is treated exactly as the original color band image with respect to identifying type C tokens with the 8×N element intensity histogram vector being used in place of the RGB color band values.

FIG. 2b shows an 11×11 pixel array at the upper left hand corner of an image file 18. The 11×11 pixel array of FIG. 2b is used to produce an intensity histogram representation for pixel p(6,6) at the center Z of the array, according to the exemplary algorithm described above. In our example, it is assumed that the 11×11 array is within a checkerboard pattern within the image depicted in the image file 18. The checkerboard pattern comprises a pattern of alternating red, green and blue boxes as shown. Thus, pixel p(6,6) of our example will have a 1 value in the corresponding Tmask generated by the CPU 12.

Pursuant to the exemplary algorithm, three 8 bin histograms are initialized by the CPU 12 (see FIG. 2c), one for each of the red, green and blue color values of the subject pixel p(6,6). The 11×11 pixel array is then used to determine the values within the bins of the three histograms. In our example, the upper left hand section of the 11×11 array is a red box of the checkerboard pattern, and each pixel within that section (p(1,1) to p(5,5)) has an RGB value of (123,0,0). The upper right hand section is green, thus the pixels within the section (p(1,7) to p(5,11)) each have an RGB value of (0,123, 0). The lower left hand section is a blue box, with each of the pixels p(7,1) to p(11,5) having RGB values of (0,0, 123). Finally the lower right hand section of our example is again a red section, with each of the pixels p(7,7) to p(11,11) having RGB values of (123,0,0), in the repeating red, green and blue checkerboard pattern.

As shown in FIG. 2b, the one (1) pixel thick cross-shaped border lines between red quadrant (p(1,1) to p(5,5)), green quadrant (p(1,7) to p(5,11)), blue quadrant (p(7,1) to p(11,5)) and red quadrant (p(7,7) to p(11,11)) or any pixel between p(6,1) to p(6,m) and any pixel between p(n,6) to p(11,6) may have an RGB value of (123,123,123). Pixel p(6,6) at the center Z may also have the RGB value of (123,123,123).

Next, an 11×11 pixel box 301, with pixel Z at its center, is used to determine the value of pixel Z via an histogram representation of pixel Z's RGB color band values using the steps exemplarily described below. As shown in FIG. 2b, p(1,1) has RGB color value of (123,0,0) indicating some presence of red color and absence of green color and blue color. Since the red value of p(1,1) is 123, the corresponding bin for that number value in red 8 bin histogram, as shown in FIG. 2c, would be incremented i.e. fourth bin within the red 8-bin histogram would be incremented. This process would repeat itself until p(n,m) in pixel box 301 is reached. By this time, three 8-bin histograms, as shown in FIG. 2c, may be filled with different values. These values may then be concatenated together into a single 8×3 element vector and assigned to pixel Z in 11×11 pixel array depicted in the image file 18 of FIG. 2b.

Consequently, according to the exemplary algorithm described above and a checkerboard pattern within 11×11 pixel box 301 shown within image 18 depicted in FIG. 2b, the 3 8-bin histogram would be filled as follows:

In red 8-bin histogram, the fourth bin would have a value of 71 (the amount of repetitions of red values between 98 and 130 in 25 pixels of 2 red quadrants plus the amount of repetitions of red values between 98 and 130 in 11 pixels between p(6,1) to p(6,m) plus the amount of repetitions of red values between 98 and 130 in 10 pixels between p(n,6) to p(11,6) resulting in 25+25+11+10=71). In a similar calculation, the first bin would have a value of 50 to indicate all of the pixels with a zero value for red. All the other bins in red 8-bin histogram would have the values of 0. Thus, the red 8-bin histogram would be [50, 0, 0, 71, 0, 0, 0, 0].

In green 8-bin histogram, the fourth bin would have a value of 46 (the amount of repetitions of green values between 98 and 130 in 25 pixels of the green quadrant plus the amount of repetitions of green values between 98 and 130 in 11 pixels between p(6,1) to p(6,m) plus the amount of repetitions of green values between 98 and 130 in 10 pixels between p(n,6) to p(11,6) resulting in 25+11+10=46). The first bin has a value of 75 (for zero values of green). All the other bins in green 8-bin histogram would have the values of 0. Thus, the green 8-bin histogram would be [75, 0, 0, 46, 0, 0 0, 0].

In blue 8-bin histogram, the fourth bin would have a value of 46 (the amount of repetitions of blue values between 98 and 130 in 25 pixels of the blue quadrant plus the amount of repetitions of blue values between 98 and 130 in 11 pixels between p(6,1) to p(6,m) plus the amount of repetitions of blue values between 98 and 130 in 10 pixels between p(n,6) to p(11,6) resulting in 25+11+10=46). The first bin, again, has a value of 75. All the other bins in blue 8-bin histogram would have the values of 0. Thus, the blue 8-bin histogram would be [75, 0, 0, 46, 0, 0, 0, 0].

As a result of the above described algorithm, each 8-bin histogram, three in our example, would be concatenated together into a single 8×3 element vector. Accordingly, this vector would be [50, 0, 0, 71, 0, 0, 0, 0, 75, 0, 0, 46, 0, 0, 0, 0, 75, 0, 0, 46, 0, 0, 0, 0].

Next, the above described vector would be assigned at p(6,6) at the center Z of the 11×11 array and therefore replace the RGB value of pixel p(6,6), which originally was (123, 123, 123), with an intensity histogram set forth as [50, 0, 0, 71, 0, 0, 0, 0, 75, 0, 0, 46, 0, 0, 0, 0, 75, 0, 0,46, 0, 0, 0, 0].

A $1^{st}$ order uniform, homogeneous Type C token comprises a single robust color measurement among contiguous pixels of the image. At the start of the identification routine of FIG. 5a, the CPU 12 (executing as the Type C tokenization block 35) sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, $N=N_{start}$. $N_{start}$ can be any integer >0, for example it can be set at set at 11 or 15 pixels.

At step 102, a seed test is begun. The CPU 12 selects a first pixel, i=(1,1) for example (see FIG. 2a), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel or the filter output intensity histogram representation of the pixel, in the event the image was filtered for texture regions, as described above. If the comparison does not result in approximately equal values (for example, within the noise levels of the recording device for RGB values) for the pixels in the seed, the CPU 12 increments the value of i (step 106), for example, i=(1, 2), for a next N×N seed sample, and then tests to determine if $i=i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, imax can be set at i=(n, m). In this manner, the routine of FIG. 5a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine. If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds tostep 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token. In the event the pixels comprise intensity histogram representations, the token can be marked as Type $C_T$.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 5B:
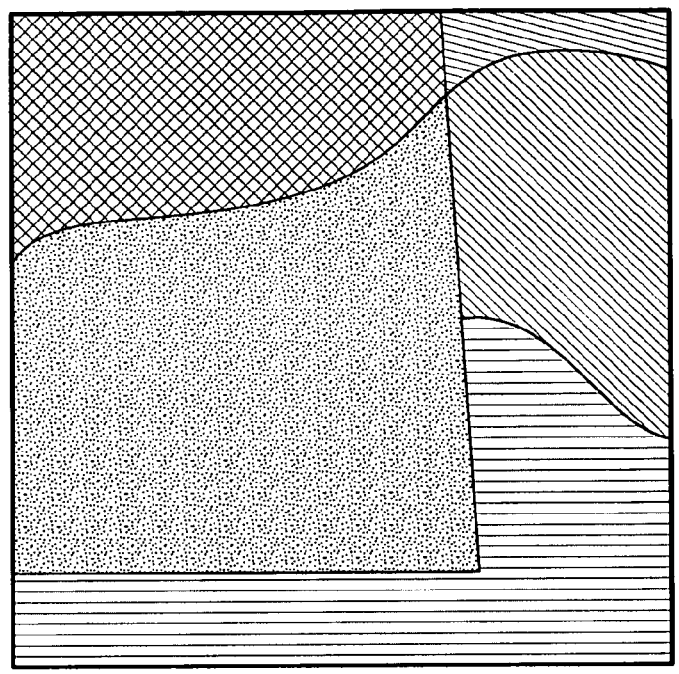
FIG. 5b is an original image used as an example in the identification of Type C tokens.
Figure 5C:
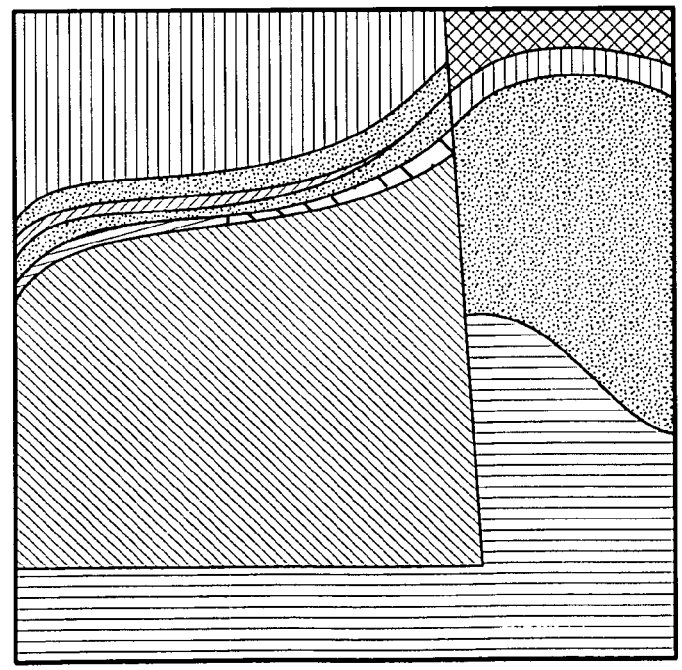
FIG. 5c shows Type C token regions in the image of FIG. 5b.

Upon arrival at $N=N_{stop}$, step 110 of the flow chart of FIG. 5a, or completion of a region map that coincides with the image, the routine will have completed the token building task. FIG. 5b is an original image used as an example in the identification of tokens. The image shows areas of the color blue and the blue in shadow, and of the color teal and the teal in shadow. FIG. 5c shows token regions corresponding to the region map, for example, as identified through execution of the routine of FIG. 5a (Type C tokens), in respect to the image of FIG. 5b. The token regions are color coded to illustrate the token makeup of the image of FIG. 5b, including penumbra regions between the full color blue and teal areas of the image and the shadow of the colored areas.

Upon completion of the routine of FIG. 5a by the Type C tokenization block 35, the service provider 24 stores the Type C token region information for the selected image. Prior to commencing any process to generate Type B tokens from the identified Type C tokens, the operators block 28 tests each identified Type C token to make certain that each Type C token encompasses a single material. While each Type C token comprises a region of the image having a single robust color measurement among contiguous pixels of the image, the token may grow across material boundaries.

Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 6:
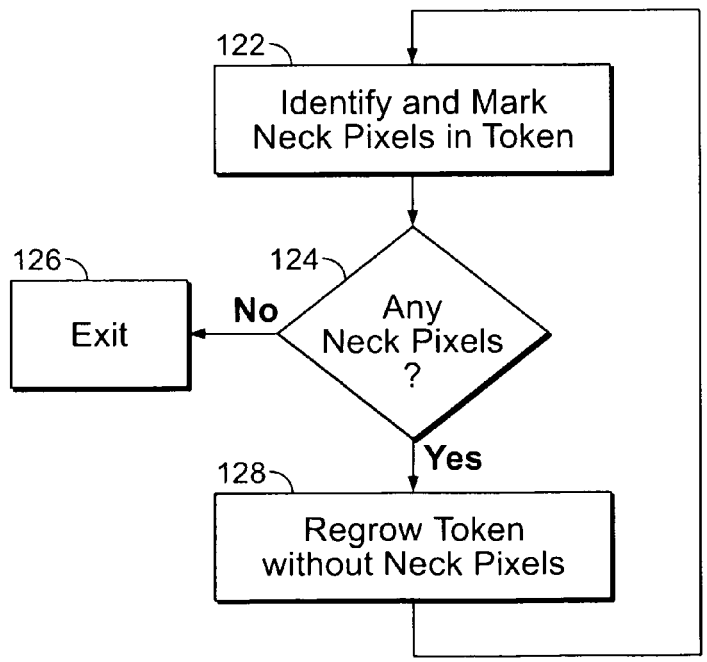
FIG. 6 is a flow chart for a routine to test Type C tokens identified by the routine of the flow chart of FIG. 5a, according to a feature of the present invention.

FIG. 6 shows a flow chart for a neck test for Type C tokens. In step 122, the CPU 12 examines each pixel of an identified token to determine whether any of the pixels under examination forms a neck. The routine of FIG. 6 can be executed as a subroutine directly after a particular token is identified during execution of the routine of FIG. 5a. All pixels identified as a neck are marked as "ungrowable." In decision block 124, the CPU 12 determines if any of the pixels were marked.

If no, the CPU 12 exits the routine of FIG. 6 and returns to the routine of FIG. 5a (step 126). If yes, the CPU 12 proceeds to step 128 and operates to regrow the token from a seed location selected from among the unmarked pixels of the current token, as per the routine of FIG. 5a, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token.

Figure 5D:
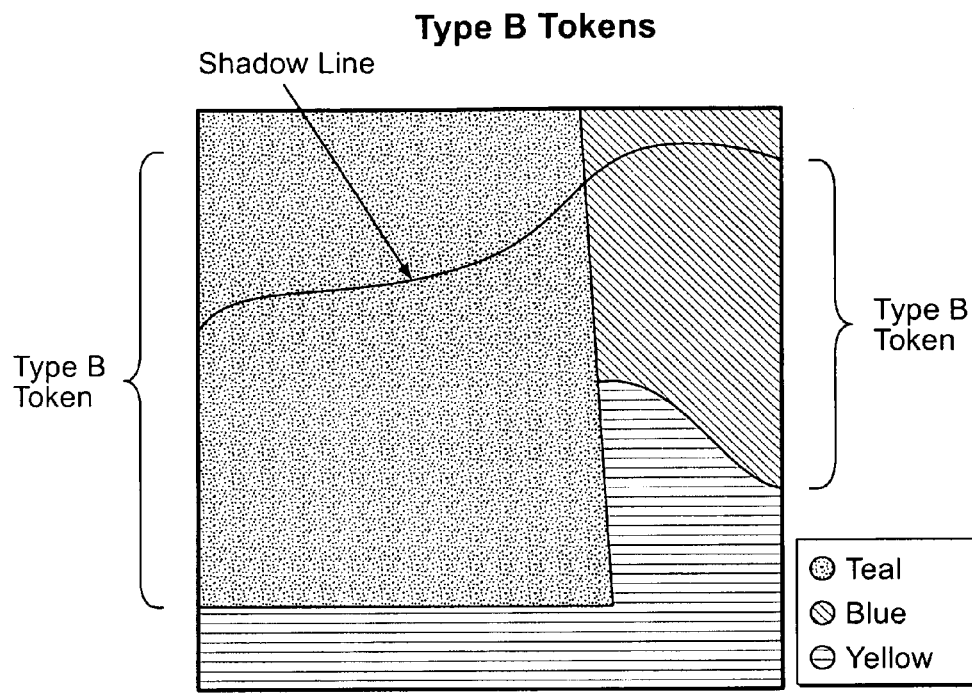
FIG. 5d shows Type B tokens, generated from the Type C tokens of figure 5c, according to a feature of the present invention.

Neck testing identifies Type C tokens that cross material boundaries, and regrows the identified tokens to provide single material Type C tokens suitable for use in creating Type B tokens. FIG. 5d shows Type B tokens generated from the Type C tokens of FIG. 5c, according to a feature of the present invention. The present invention provides several exemplary techniques of pixel characteristic analysis for constructing Type B tokens from Type C tokens. One exemplary technique involves arbitrary boundary removal. The arbitrary boundary removal technique can be applied to Type C tokens whether they were generated using N color band values (RGB in our example) of the pixel or the filter output representation of the pixel, in the event the image was filtered. Actual boundaries of any particular Type C token will be a function of the seed location used to generate the token, and are thus, to some extent arbitrary. There are typically many potential seed locations for each particular token, with each potential seed location generating a token with slightly different boundaries and spatial extent because of differences among the color values of the pixels of the various seeds, within the noise ranges of the recording equipment.

Figure 7:
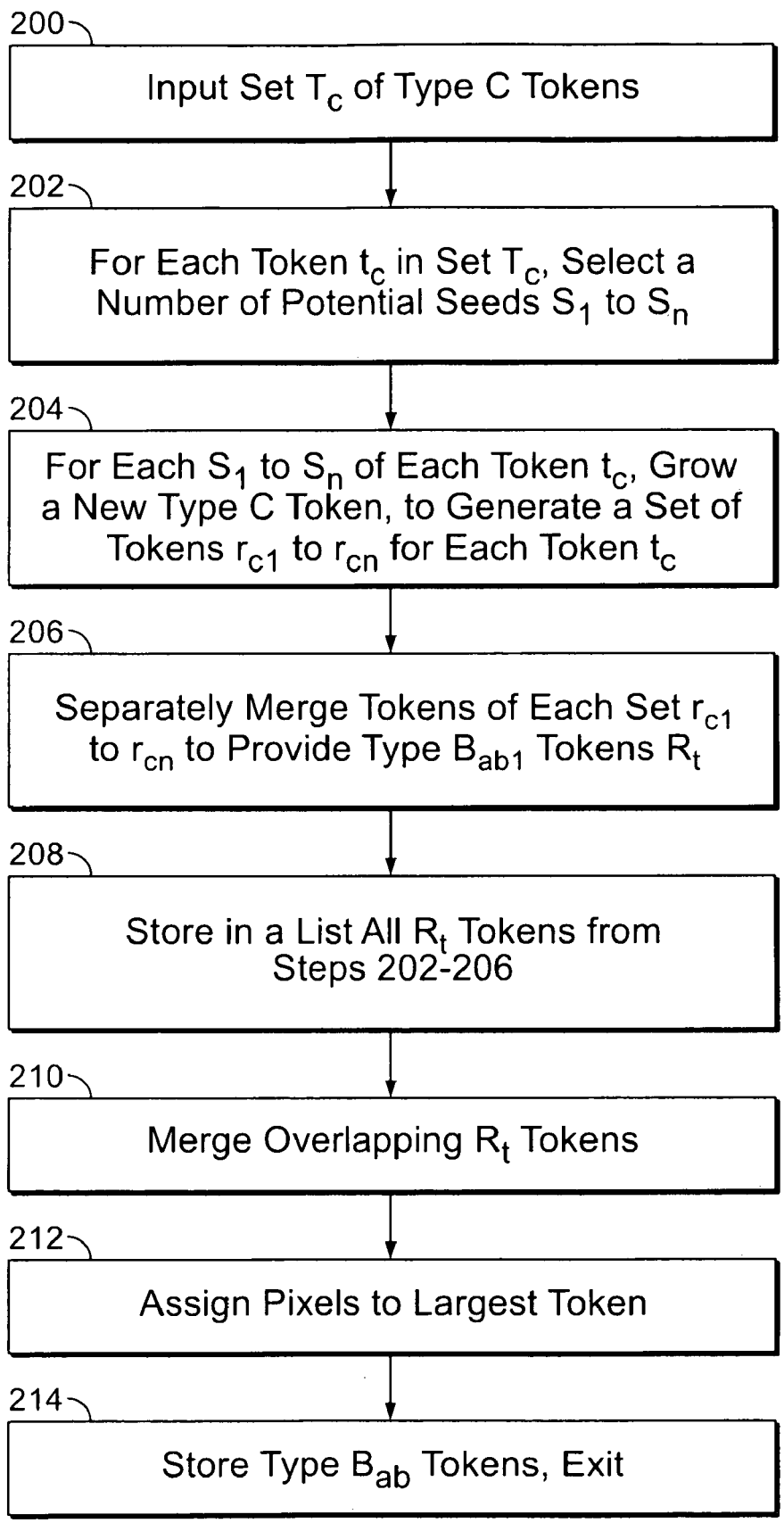
FIG. 7 is a flow chart for constructing Type B tokens via an arbitrary boundary removal technique, according to a feature of the present invention.

FIG. 7 is a flow chart for constructing Type B tokens via an arbitrary boundary removal technique, according to a feature of the present invention. In step 200, the CPU 12 is provided with a set ($T_c$) of Type C tokens generated with a seed size (S) via the routine of FIG. 5a, with neck removal via the routine of FIG. 6. The seed size $S=S_{max}$, for example, S=4 pixels. In step 202, for each Type C token, $t_c$ in the set $T_c$ the CPU 12 selects a number (for example 50) of potential seeds $s_1$ to $s_n$. In our example, each selected seed will be a 4×4 pixel array from within the token region, the pixels of the array being of approximately equal values (within the noise levels of the recording device).

In step 204, the CPU 12 grows a new Type C token, utilizing the routines of FIGS. 5a and 6, from each seed location, $s_1$ to $s_n$ of each token $t_c$ in the set $T_c$. The newly grown tokens for each token $t_c$ are designated as tokens $r_{c1}$ to $r_{cn}$. The newly grown tokens $r_{c1}$ to $r_{cn}$ for each token $t_c$ generally overlap the original Type C token $t_c$, as well as one another.

In step 206, the CPU 12 operates to merge the newly generated tokens $r_{c1}$ to $r_{cn}$ of each token $t_c$, respectively. The result is a new token $R_1$ corresponding to each original token $t_c$ in the set $T_c$. Each new token $R_1$ encompasses all of the regions of the respective overlapping tokens $r_{c1}$ to $r_{cn}$ generated from the corresponding original token $t_c$. The unions of the regions comprising the respective merged new tokens $R_{1t}$ are each a more extensive token than the original Type C tokens of the set. The resulting merged new tokens $R_t$ result in regions of the image file 18, each of a much broader range of variation between the pixels of the respective token $R_t$ than the original Type C token, yet the range of variation among the constituent pixels will still be relatively smooth. $R_t$ is defined as a limited form of Type B token, Type $B_{ab1}$, to indicate a token generated by the first stage (steps 200-206) of the arbitrary boundary removal technique according to a feature of the present invention.

In step 208, the CPU 12 stores each of the Type $B_{ab1}$ tokens generated in steps 202-206 from the set of tokens $T_c$, and proceeds to step 210. Type $B_{ab1}$ tokens generated via execution of steps 202-206 may overlap significantly. In step 210, the CPU 12 operates to merge the $R_t$ tokens stored in step 208 that overlap each other by a certain percentage of their respective sizes. For example, a 30% overlap is generally sufficient to provide few, if any, false positive merges that combine regions containing different materials. The new set of merged tokens still may have overlapping tokens, for example, previously overlapping tokens that had a less than 30% overlap. After all merges are complete, the CPU 12 proceeds to step 212.

In step 212, the CPU 12 identifies all pixels that are in more than one token (that is in an overlapping portion of two or more tokens). Each identified pixel is assigned to the token occupying the largest region of the image. Thus, all overlapping tokens are modified to eliminate all overlaps.

Figure 8:
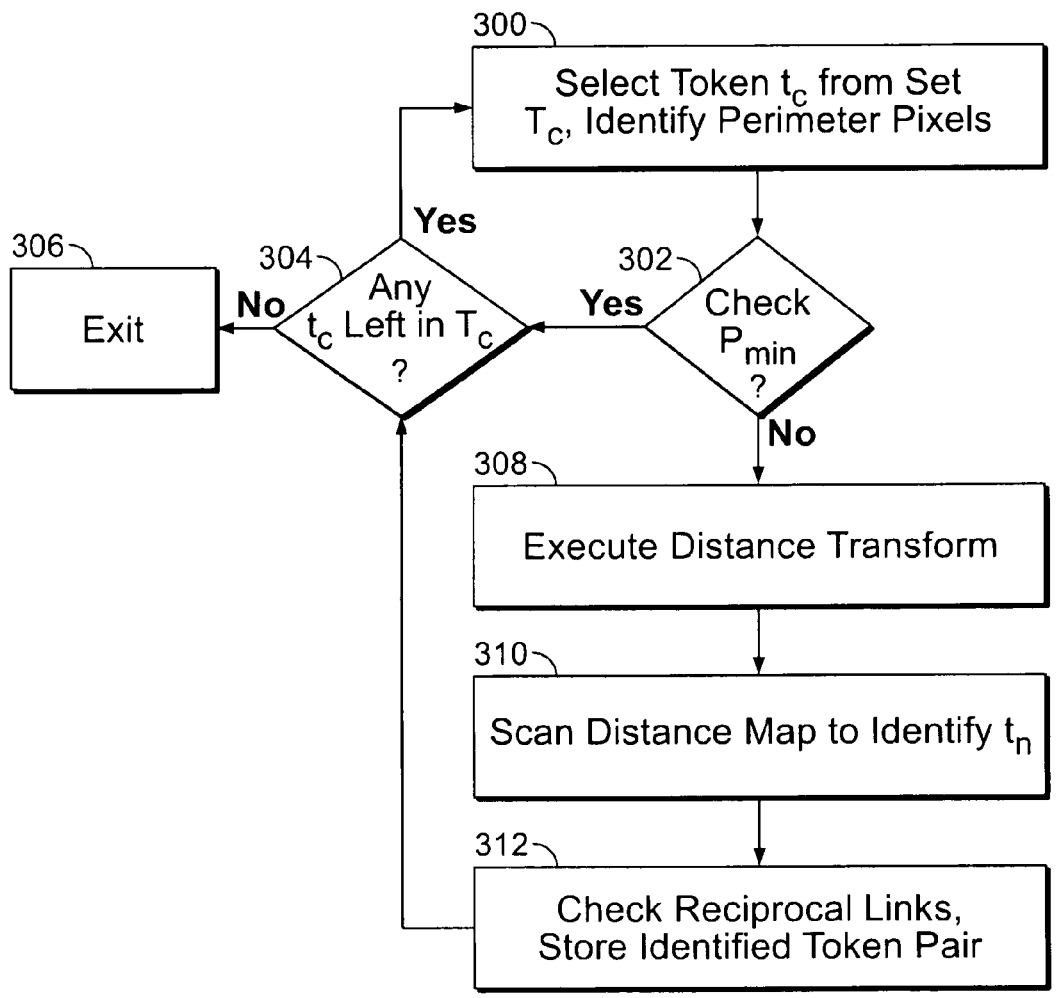
FIG. 8 is a flow chart for creating a token graph, containing token map information, according to a feature of the present invention.

In step 214, the CPU 12 (as the Type C tokenization block 35 or the operators block 28) stores the final set of merged and modified tokens, now designated as Type $B_{ab2}$ tokens, and then exits the routine. As noted above, the Type $B_{ab2}$ tokens were generated from Type C tokens whether the Type C tokens were generated using N color band values (RGB in our example) of the pixel or the filter output representation of the pixel, in the event the image was filtered. A second exemplary technique according to the present invention, for using Type C tokens to create Type B tokens, is adjacent planar token merging. The adjacent planar token merging can be implemented when an image depicts areas of uniform color, that is for non-textured regions of an image. Initially, a token graph is used to identify tokens that are near to one another. FIG. 8 shows a flow chart for creating a token graph, containing token map information, according to a feature of the present invention. Each token $t_c$ in the set of Type C tokens $T_c$, generated through execution of the routines of FIGS. 5a and 6, is evaluated in terms of a maximum distance $D_{max}$ between tokens defining a neighboring pair of tokens, $t_c$, $t_n$, of the set $T_c$, a minimum number of token perimeter pixels, $P_{min}$, in each token of the neighboring pair of tokens, and a minimum fraction of perimeter pixels, $F_{min}$, of each token of a neighboring pair of tokens, required to be within $D_{max}$.

In step 300, the CPU 12 selects a Type C token $t_c$ in the set of Type C tokens $T_c$, and identifies the pixels of the selected token $t_c$ forming the perimeter of the token. In a decision block 302, the CPU 12 determines whether the number of perimeter pixels is less than $P_{min}$, for example 10 pixels.

If yes, the CPU 12 proceeds to decision block 304 to determine whether there are any remaining tokens $t_c$ in the set of Type C tokens $T_c$. If yes, the CPU 12 returns to step 300, if no, the CPU 12 exits the routine 306.

If no, the CPU 12 proceeds to step 308. In step 308, the CPU 12 generates a bounding box used as a mask to surround the selected token $t_c$. The bounding box is dimensioned to be at least $D_{max}$ larger than the selected token $t_c$ in all directions. A known distance transform (for example, as described in P. Felzenszwalb and D. Huttenlocher, Distance Transforms of Sampled Functions, Cornell Computing and Information Science Technical Report TR2004-1963, September 2004), is executed to find the distance from each perimeter pixel of the selected token $t_c$ to all the pixels in the surrounding bounding box. The output of the distance transform comprises two maps, each of the same size as the bounding box, a distance map and a closest pixel map. The distance map includes the Euclidean distance from each pixel of the bounding box to the nearest perimeter pixel of the selected token $t_c$. The closest pixel map identifies, for each pixel in the distance map, which perimeter pixel is the closest to it.

In step 310, the CPU 12 scans the distance map generated in step 308 to identify tokens corresponding to pixels of the bounding box (from the region map generated via the routine of FIG. 5a), to identify a token from among all tokens represented by pixels in the bounding box, that has a number $N_{cn}$ of pixels within the distance $D_{max}$, wherein $N_{cn}$ is greater than $P_{min}$, and greater than $F_{min}$ * perimeter pixels of the respective token and the average distance between the respective token and $t_c$ is the lowest of the tokens corresponding to the pixels in the bounding box. If these conditions are satisfied, the respective token is designated $t_n$ of a possible token pair $t_c$, $t_n$, and a link $L_{cn}$ is marked active.

In step 312, the CPU 12 checks to determine whether a reciprocal link $L_{cn}$ is also marked active, and when it is marked active, the CPU 12 marks and stores in the token graph, an indication that the token pair $t_c$, $t_n$ is a neighboring token pair. The reciprocal link refers to the link status in the evaluation of the token designated as $t_n$ in the current evaluation. If that token has yet to be evaluated, the pair is not designated as a neighboring token pair until the link $L_{cn}$ is verified as active in the subsequent evaluation of the token $t_n$. The CPU 12 then returns to decision block 304 to determine whether there are any further tokens in the set $T_c$.

Figure 9:
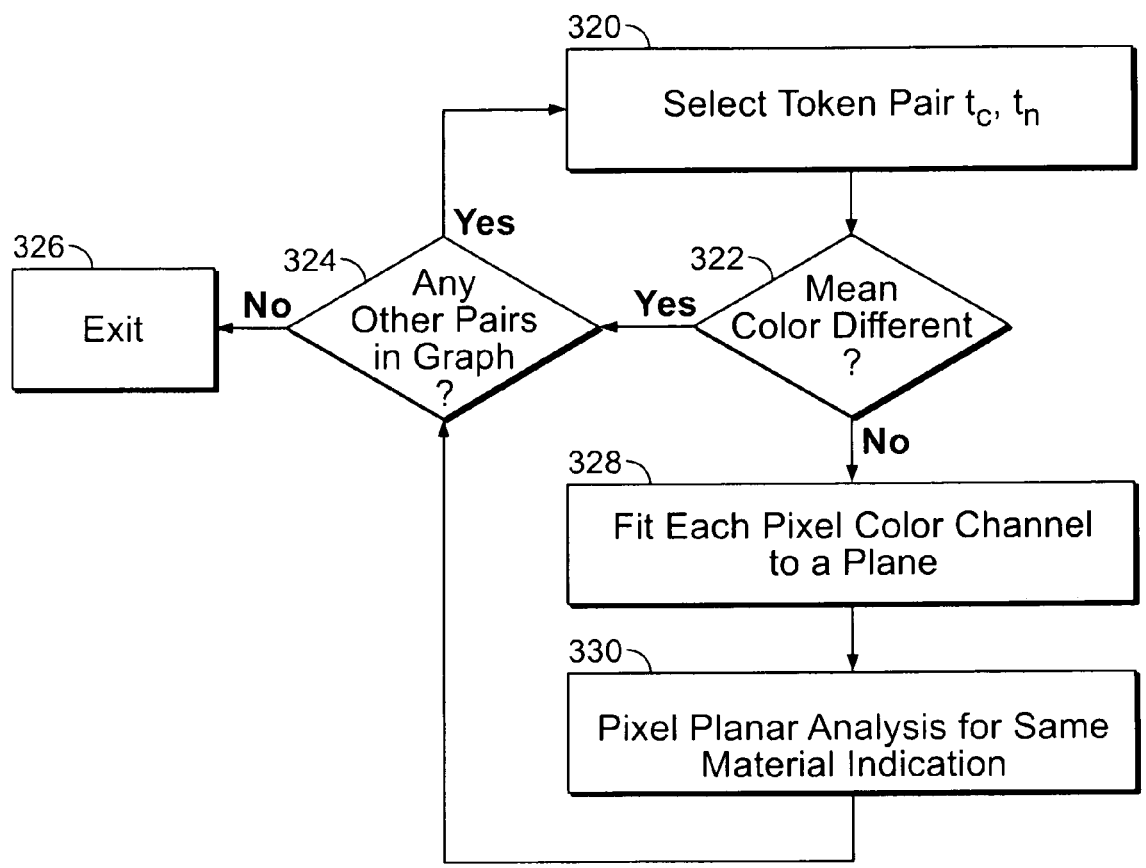
FIG. 9 is a flow chart for constructing Type B tokens via an adjacent planar token merging technique, according to a feature of the present invention.

Upon completion of the token graph, the CPU 12 utilizes token pair information stored in the graph in the execution of the routine of FIG. 9. FIG. 9 shows a flow chart for constructing Type B tokens via the adjacent planar token merging technique, according to a feature of the present invention. In the adjacent planer merging technique, pairs of tokens are examined to determine wether there is a smooth and coherent change in color values, in a two dimensional measure, between the tokens of the pair. The color change is examined in terms of a planar representation of each channel of the color, for example the RGB components of the pixels according to the exemplary embodiments of the present invention. A smooth change is defined as the condition when a set of planes (one plane per color component) is a good fit for the pixel values of two neighboring tokens. In summary, neighboring tokens are considered the same material and a Type B token when the color change in a two-dimensional sense is approximately planar.

In step 320, the CPU 12 selects a token pair $t_c$, $t_n$ from the token graph. In decision block 322, the CPU 12 determines whether the mean color in token $t_c$ is significantly different from the mean color in the token $t_c$. The difference can be a function of a z-score, a known statistical measurement (see, for example, Abdi, H. (2007), Z-scores, in N. J. Salkind (Ed.), Encyclopedia of Measurement and Statistics, Thousand Oaks, Calif.: Sage), for example, a z-score greater than 3.0.

If the mean colors of the token pair are different, the CPU 12 proceeds to decision block 324 to determine whether there are any additional token pairs in the token graph. If yes, the CPU 12 returns to step 320. If no, the CPU 12 exits the routine (step 326).

If the mean colors are within the z-score parameter, the CPU 12 proceeds to step 328. In step 328, the CPU 12 performs a mathematical operation such as, for example, a least median of squares regression (see, for example, Peter J. Rousseeuw, Least Median of Squares Regression, Journal of the American Statistical Association, Vol. 79, No. 388 (December, 1984), pp. 871-880) to fit a plane to each color channel of the pixels (in our example RGB) of the token pair $t_c$, $t_n$, as a function of row n and column m (see FIG. 2), the planes being defined by the equations:

$$R = X_R n + Y_R m + Z_R \quad G = X_G n + Y_G m + Z_G \quad B = X_B n + Y_B m + Z_B$$

wherein parameter values X, Y and C are determined by the least median of squares regression operation of the CPU 12.

Upon completion of the plane fitting operation, the CPU 12 proceeds to step 330. In step 330, the CPU 12 examines each pixel of each of the tokens of the token pair $t_c$, $t_n$ to calculate the z-score between each pixel of the tokens and the planar fit expressed by the equation of the least median of squares regression operation. When at least a threshold percentage of the pixels of each token of the pair (for example, 80%), are within a maximum z-score (for example, 0.75), then the neighboring token pair is marked in the token graph as indicating the same material in the image. After completion of step 330, the CPU 12 returns to decision block 324.

Upon exiting the routine of FIG. 9, the CPU 12 examines the token graph for all token pairs indicating the same material. The CPU 12 can achieve the examination through performance of a known technique such as, for example, a union find algorithm. (See, for example, Zvi Galil and Giuseppe F. Italiano. Data structures and algorithms for disjoint set union problems, ACM Computing Surveys, Volume 23, Issue 3 (September 1991), pages 319-344). As a simple example, assume a set of seven Type C tokens $T_1$, $T_2$, $T_3$, $T_4$, $T_5$, $T_6$, $T_7$. Assume that the result of the execution of FIG. 9, (performance of the adjacent planar analysis), indicates that tokens $T_1$ and $T_2$ are marked as the same material, and tokens $T_1$ and $T_3$ are also marked as the same material. Moreover, the results further indicate that tokens $T_4$ and $T_5$ are marked as the same material, and tokens $T_5$ and $T_6$ are also marked as the same material. The result of execution of the union find algorithm would therefore indicate that tokens $\{T_1, T_2, T_3\}$ form a first group within the image consisting of a single material, tokens $\{T_4, T_5, T_6\}$ form a second group within the image consisting of a single material, and token $\{T_7\}$ forms a third group within the image consisting of a single material. The groups $\{T_1, T_2, T_3\}$, $\{T_4, T_5, T_6\}$ and $\{T_7\}$ form three Type B tokens.

Figure 10:
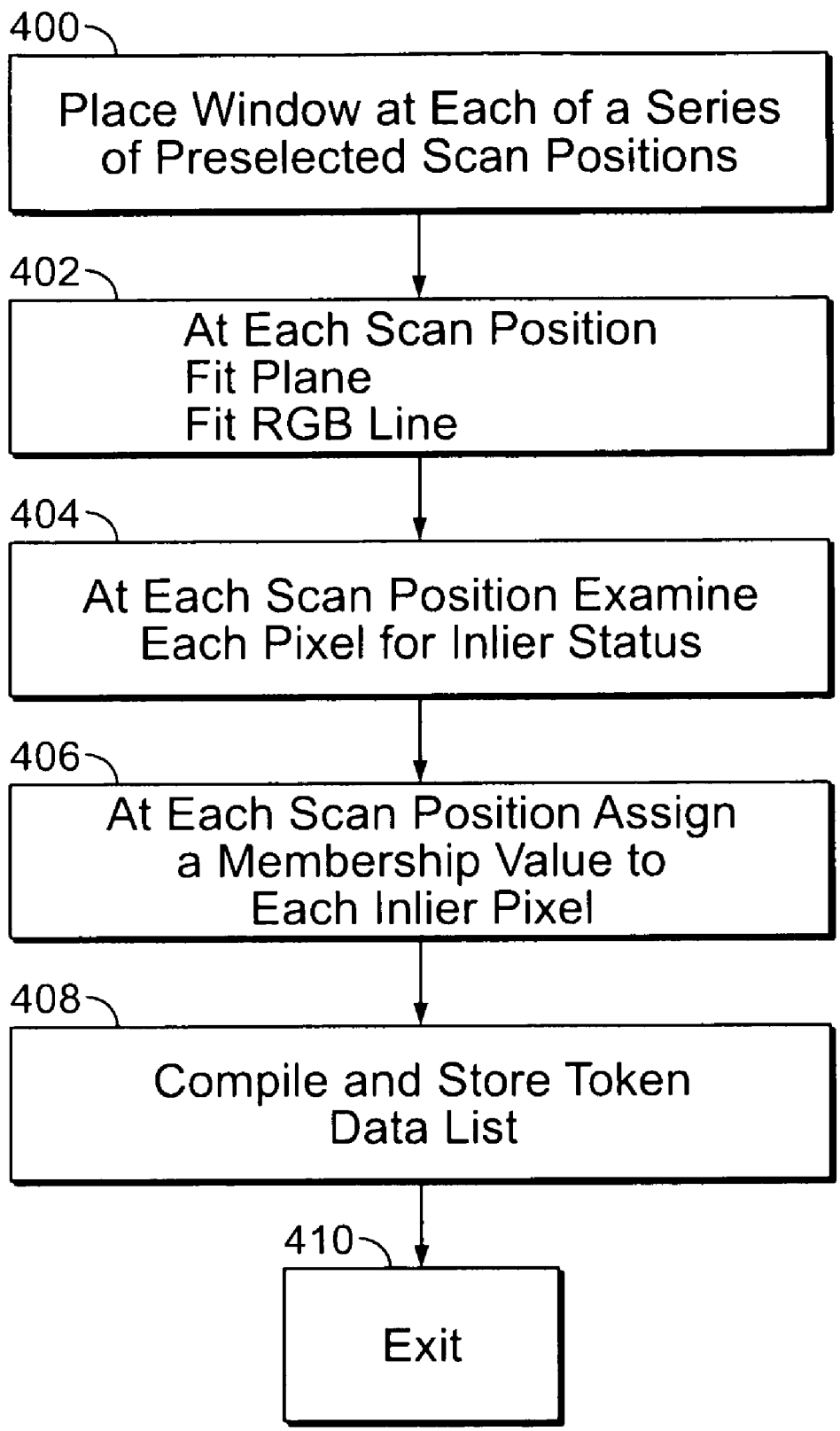
FIG. 10 is a flow chart for generating Type C tokens via a local token analysis technique, according to a feature of the present invention.

A third exemplary technique according to the present invention, for using Type C tokens to create Type B tokens, is a local token analysis. A local token approach generates Type C tokens using a window analysis of a scene depicted in an image file 18. Such tokens are designated as Type $C_w$ tokens. FIG. 10 is a flow chart for generating Type $C_w$ tokens via the local token analysis technique, according to a feature of the present invention.

In step 400, the CPU 12 places a window of fixed size, for example, a 33×33 pixel array mask, over a preselected series of scan positions over the image. The window can be a shape other than a square. The scan positions are offset from one another by a fixed amount, for example ½ window size, and are arranged, in total, to fully cover the image. The window area of pixels at each scan position generates a Type $C_w$ token, though not every pixel within the window at the respective scan position is in the Type $C_w$ token generated at the respective scan position.

At each scan position (step 402), the CPU 12 operates, as a function of the pixels within the window, to fit each of a set of planes, one corresponding to the intensity of each color channel (for example, RGB), and an RGB line in RGB space, characterized by a start point $I_0$ and an end point $I_1$ of the colors within the window. The planar fit provides a spatial representation of the pixel intensity within the window, and the line fit provides a spectral representation of the pixels within the window.

For the planar fit, the planes are defined by the equations:

$$R = X_R n + Y_R m + Z_R \quad G = X_G n + Y_G m + Z_G \quad B = X_B n + Y_B m + Z_B$$

wherein parameter values X, Y and C are determined by CPU 12 by executing a mathematical operation such as the least median of squares regression discussed above, a least-squares estimator, such as singular value decomposition, or a robust estimator such as RANSAC (see, for example, M. A. Fischler, R. C. Bolles. Random Sample Consensus: A Paradigm for Model Fitting with Applications to Image Analysis and Automated Cartography. Comm. of the ACM, Vol 24, pp 381-395, 1981).

For the RGB line fit, the line is defined by:
$I(r,g,b) = I_0(r,g,b) + t(I_1(r,g,b) - I_0(r,g,b))$ wherein the parameter t has a value between 0 and 1, and can be determined by the CPU 12 utilizing any of the mathematical techniques used to find the planar fit.

At each scan position, after completion of step 402, the CPU 12 operates in step 404 to examine each pixel in the window in respect of each of the planar fit representation and RGB line representation corresponding to the respective window scan position. For each pixel, the CPU 12 determines an error factor for the pixel relative to each of the established planes and RGB line. The error factor is related to the absolute distance of the pixel to its projection on either from either the planar fit or the RGB line fit. The error factor can be a function of the noise present in the recording equipment or be a percentage of the maximum RGB value within the window, for example 1%. Any pixel distance within the error factor relative to either the spatial planar fit or the spectral line fit is labeled an inlier for the Type $C_w$ token being generated at the respective scan position. The CPU 12 also records for the Type $C_w$ token being generated at the respective scan position, a list of all inlier pixels.

At each scan position, after completion of step 404, the CPU 12 operates in step 406 to assign a membership value to each inlier pixel in the window. The membership value can be based upon the distance of the inlier pixel from either the planar fit or the RGB line fit. In one exemplary embodiment of the present invention, the membership value is the inverse of the distance used to determine inlier status for the pixel. In a second exemplary embodiment, a zero-centered Gaussian distribution with a standard deviation is executed to calculate membership values for the inlier pixels.

After all of the scan positions are processed to generate the Type $C_w$ tokens, one per scan position, the CPU 12 operates to compile and store a token data list (step 408). The token data list contains two lists. A first list lists all of the pixels in the image file 18, and for each pixel, an indication of each Type $C_w$ token to which it labeled as an inlier pixel, and the corresponding membership value. A second list lists all of the generated Type $C_w$ tokens, and for each token an indication of the inlier pixels of the respective token, and the corresponding membership value. After compiling and storing the token data list, the CPU 12 exits the routine (step 410).

Figure 11:
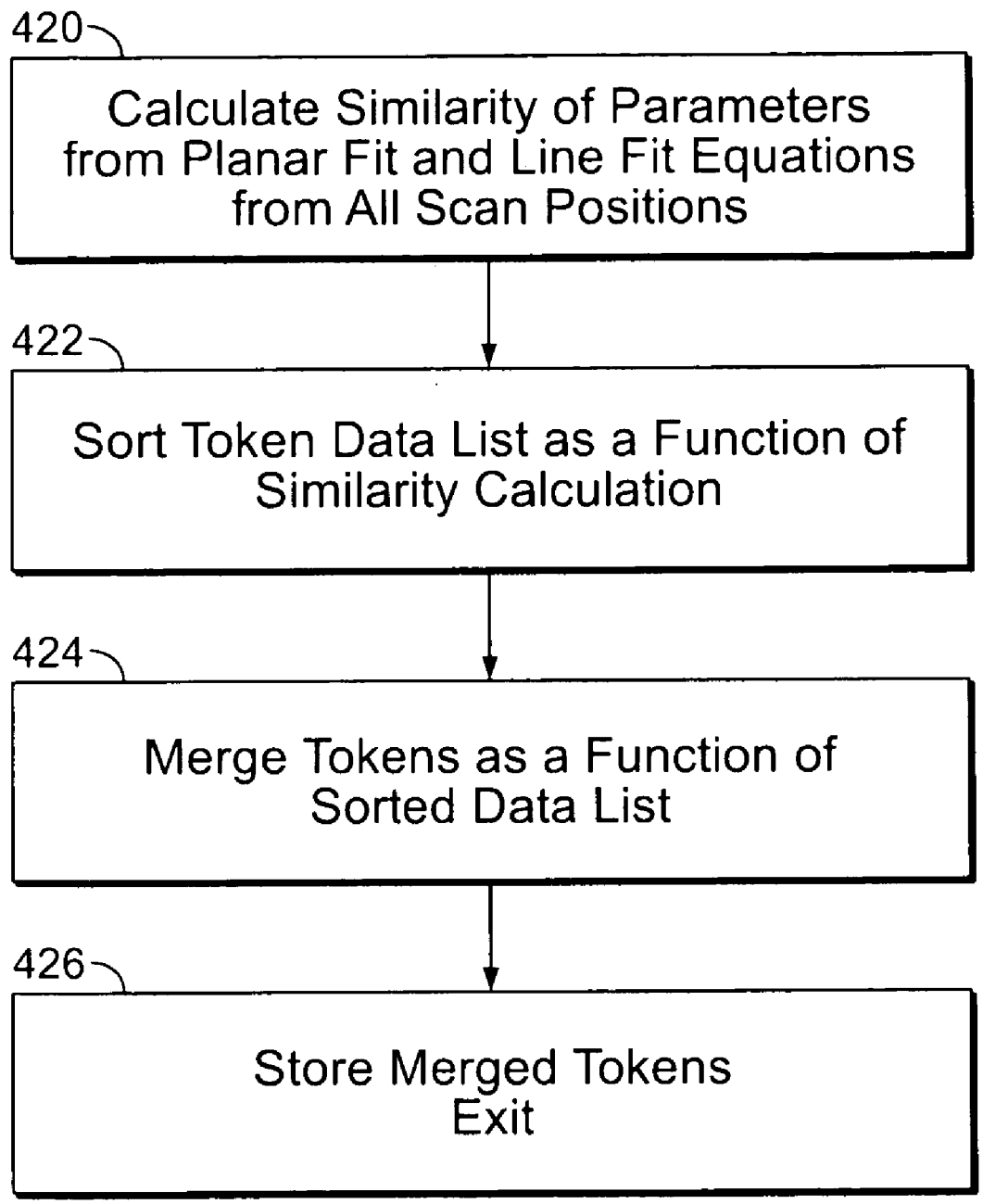
FIG. 11 is a flow chart for constructing Type B tokens from Type C tokens generated via the local token analysis technique of FIG. 10, according to a feature of the present invention.

FIG. 11 is a flow chart for constructing Type B tokens from the Type $C_w$ tokens generated via the local token analysis technique, according to a feature of the present invention. In step 420, the CPU 12 calculates a similarity of parameters of the spatial planer dimensions and spectral RGB lines of adjacent or overlapping Type $C_w$ tokens generated through execution of the routine of *figure*108. Overlapping and adjacent Type $C_w$ tokens can be defined as tokens corresponding to scan positions that overlap or are contiguous. A similarity threshold can be set as a percentage of difference between each of the spatial planer dimensions and spectral RGB lines of two overlapping or adjacent Type $C_w$ tokens being compared. The percentage can be a function of the noise of, for example, the camera 14 used to record the scene of the image file 18. All overlapping or adjacent Type $C_w$ token pairs having a calculated similarity within the similarity threshold are placed on a list.

In step 422, the CPU 12 sorts the list of overlapping or adjacent Type $C_w$ token pairs having a calculated similarity within the similarity threshold, in the order of most similar to least similar pairs. In step 424, the CPU 12 merges similar token pairs, in the order of the sort, and labeling pairs as per degree of similarity. Each merged token pair will be considered a Type$_B$ token. In step 426, the CPU 12 stores the list of Type$_B$ tokens, and exits the routine.

In a further exemplary technique according to the present invention, a filter response, such as, for example, a second derivative filter response, is executed by the CPU 12 to identify regions of an image having uniform material reflectance. The identified regions are then used to generate Type B tokens. A filter response can be implemented by performing a convolution of pixel values. Convolution is a mathematical technique that applies a filter mask to an array of pixels to determine a function response value for a pixel at the center of the array. The filter mask represents a mathematical function such as, for example, a Laplacian of Gaussian kernel (LoG). The LoG filter is a known filter used to determine a mathematical function output value at each pixel location of an image, an output value that is related to a derivative value at the respective pixel location, and utilized to detect material edges in an image.

Figure 12A:
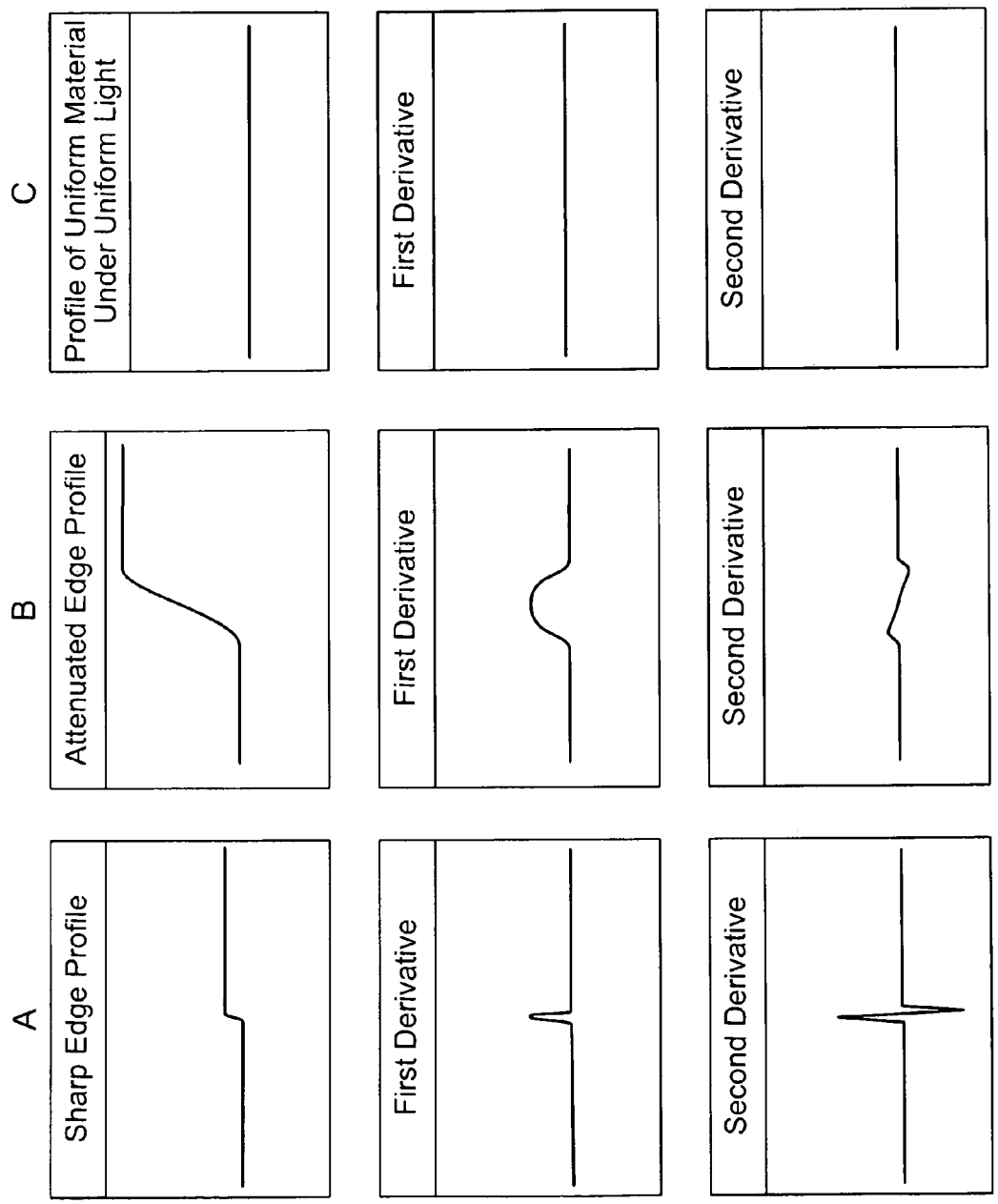
FIG. 12a shows intensity profiles and corresponding first derivative and second derivative profiles for each of a material edge, a single material with a shadow over a portion of the material and a single material under constant illumination.

FIG. 12*a* shows intensity profiles within an image, and corresponding first derivative and second derivative profiles for each of a material edge, a single material with a shadow over a portion of the material and a single material under constant illumination. A derivative is a measure of a fate of change. In an image, a first derivative measures the rate of change in the intensity of a color band, for example, the rate of change of red, from pixel to pixel of the image. A second derivative is a measure of the rate of change of the rate of change, i.e., a measure of the rate of change of the first derivative. The A column of FIG. 12*a* shows the intensity profile, and first and second derivative profiles at a material edge within an image. As shown in column A, the color intensity profile forms a sharp edge profile at a material boundary, resulting in a spike in the first derivative value reflecting the sharp rate of change of material intensity at the material boundary. Consequently, the second derivative value undergoes a zero crossing, first peaking in the positive direction as the first derivative peaks at the boundary, and then crossing zero and peaking in the negative direction as the first derivative peak returns to zero.

In the known LoG filter technique, high first derivative values, first derivative peaks or second derivative zero crossings among pixels, are utilized as indicia of a material edge, as reflected in column A of FIG. 12*a*. In contrast to the first derivative peaks and second derivative zero crossings of a material edge, columns B and C of FIG. 12*a* show, respectively, intensity profiles and corresponding first derivative and second derivative profiles for each of a single material with a shadow over a portion of the material and a single material under constant illumination. In column B, the intensity of the image undergoes an attenuated edge, corresponding to the penumbra of a shadow falling across pixels representing a single material. Thus, the first derivative slowly raises and falls with the attenuated change of a penumbra, and the second derivative remains at a relatively low value throughout the slow rise and fall of the first derivative value. As shown in column $C_w$ a constant value for the illumination of a single material results in a constant low value among pixels for each of the first derivative and second derivative values.

According to a feature of the present invention, a second derivative filter, such as, for example, a LoG filter, is used in a novel manner, to identify regions of an image, for example, patches comprising pixels having uniformly low second derivative values, as shown in each of columns B and C of FIG. 12*a*. In an exemplary embodiment, each patch is of a preselected size (for example, either a 3×3 pixel array, a 5×5 pixel array or a 7×7 pixel array). As described above, a patch of uniform material reflectance under uniform light will have a near constant color value across the pixels of the patch, resulting in a low value for the second derivative at each pixel location in the patch. Additionally, a constant material reflectance in an attenuated penumbra will also result in a low value for the second derivative among pixels of a patch.

Thus, ascertaining the location of a patch of pixels, all having a low value for the second derivative, provides a high indication of likelihood that there is not a material edge within the patch, and that all of the pixels of the patch have the same material reflectance. The present invention contemplates any function response among a patch of pixels that is relevant to a likelihood of uniform material reflectance, such as, for example, second derivative values, third derivative values or other measures of the. curvature of the intensity profile of the image, where the intensity profile is the shape of the image in (x, y, intensity) space.

A Laplacian filter provides a sum of partial second derivatives at a point in the image. A Laplacian filter can therefore be implemented to ascertain function outputs proportional to the second derivative values for pixels of an image. The Laplacian of an image I is defined as:

$$\nabla^2 I = \frac{\partial^2 I}{\partial x^2} + \frac{\partial^2 I}{\partial y^2}$$

The above function is the sum of the second partial derivatives in the x and y directions (along the n rows and m columns of the array of FIG. 2), and is proportional to the average second derivative across all directions.

Due to the presence of noise and small-scale variations in an image, first and second derivative analysis of an image is typically performed on a blurred version of the image. A blurred version of an image smooths out any irregularities caused by noise and image variations, and can be obtained through any standard blurring function. For example, a convolution of the image with a filter mask based upon a Gaussian function. A Gaussian function can be defined by:

$$G_\sigma(x, y) = \frac{1}{2\pi\sigma^2} e^{-(x^2+y^2)/(2\sigma^2)}$$

The σ factor is the standard deviation and controls the degree of blurring of a convolved image. A small value for σ results in a relatively small degree of blurring, while a large value for a results in significant blurring.

An LoG function combines the Laplacian and Gaussian functions into a single function that serves to both blur the image and ascertain the Laplacian values to provide accurate outputs proportional to the second derivative values for the pixels of an image. In place of the LoG function, a Difference of Gaussians or convolution with simple derivative masks on a blurred image can be used. An LoG function equation is as follows:

$$\nabla^2 G_\sigma(x, y) = \frac{\partial^2 G_\sigma}{\partial x^2} + \frac{\partial^2 G_\sigma}{\partial y^2}$$

$$= \left(\frac{x^2 + y^2 - 2\sigma^2}{2\sigma^6 \pi}\right) e^{-(x^2+y^2)/(2\sigma^2)}$$

FIG. 12b is an example of an LoG filter mask. The mask comprises a 2k+1×2k+1 array of multiplication factors, in our example, k=3, for 7 rows of factors, each with 7 columns, thus, a length of 7 σ relative to the center, with σ=1 in the filter mask of FIG. 12b. The filter mask of FIG. 12b is arranged for use in connection with a convolution of the image via 7×7 pixel patch samples of the image file of FIG. 2a. The multiplication factors express the LoG function and are applied to the pixels of the corresponding patch, and all the results are summed to provide a function response value for the pixel at the center of the 7×7 array, as will be described.

To that end, FIG. 12c shows an illustration of a representative pixel patch comprising an 7×7 array within the n×m pixel array of the image file of FIG. 2a. The 7×7 patch in the example of FIG. 12b forms the upper left hand corner of the n×m pixel array of FIG. 2a, and would be used to calculate a value proportional to the second derivative for the pixel p(4, 4), the center pixel of the representative array (shown in bold).

Each multiplication factor of the filter mask corresponds to a function response for a corresponding pixel of the 7×7 patch, and is used to calculate a multiplication result for the respective pixel of the patch. The multiplication factor applied to each pixel is determined in relation to the combined Laplacian and Gaussian functions set forth above, (an LoG filter mask) as is known in the art. The filter mask expresses the following summation equation:

Output $p(n, m) = \Sigma_{i=-k}^{k} \Sigma_{j=-k}^{k} p(n+i, m+j) \text{LoG}(i, j)$.

Each pixel p(n, m) is represented by N color bands, for example RGB, for the red, green and blue components of the color value for the pixel p(n, m). The multiplication factors of the filter mask will be applied separately to each color band of the pixels of the patch, resulting in a separate second derivative value for each color band. In our example, we will describe the calculation for the red band (p(n, m RED)). Thus, p(1,1 RED) is multiplied by the factor 0.00031426, while the next pixel of the row, p(1,2 RED) is multiplied by the factor 0.002632078, and so on. The pixels of each row, 1-7 are multiplied in order, across the columns, by the multiplication factors at the corresponding rows and columns of the LoG filter mask. The results of all the multiplications are added together to provide a sum that is proportional to a second derivative value for the center pixel p(4,4), as a function of the LoG function.

A similar filter response output is performed for each pixel p(n, m) of the n×m array and for each color band of each pixel, to compile a list of second derivative values for the pixels p(n, m) of an image file 18. At border regions of the image, for example, pixels within 3 pixels of the image boundary, for pixel values of points of the 7×7 patch that extend beyond the image boundary, estimates can be made for the respective color values, based upon various assumptions, as follows:

1. assume the values for pixels at the image boundary continue beyond the boundary, such that values for pixels in the patch that extend beyond the image boundary are set at the same color intensity as the color intensity of the nearest boundary pixel;
2. assume the image reflects at the boundary, for example, the values for pixels of the patch beyond the image boundary are a mirror image of corresponding pixels within the image; or
3. assume all values outside the image are a constant value, such as 0 or the maximum image value.

Second derivative values can be either positive or negative. In the exemplary embodiment of the present invention, an absolute value is used for the second derivative. Moreover, the values for each band, in our example, red, green and blue, are represented as a single number per pixel. The single number value can be obtained by taking the maximum second derivative filter response output from among the color bands of the pixel, taking an average for the filter response outputs of all the bands or, in hyperspectral imagery, taking a percentile value from each band, for example the 90$^{th}$ percentile value filter output value from among the color bands.

In one embodiment of the filter response feature, second derivative values are determined in a log space version or a gamma transform of the image. When a region of an image is very dark, and, further, in deep shadow, first and second derivatives become small, and are not useful as accurate indications of regions of uniform material reflectance. The use of logarithmic values of color intensity or a gamma transform maintains an equality of color differences, regardless of the illumination flux (or image exposure) affecting the image.

Figure 13:
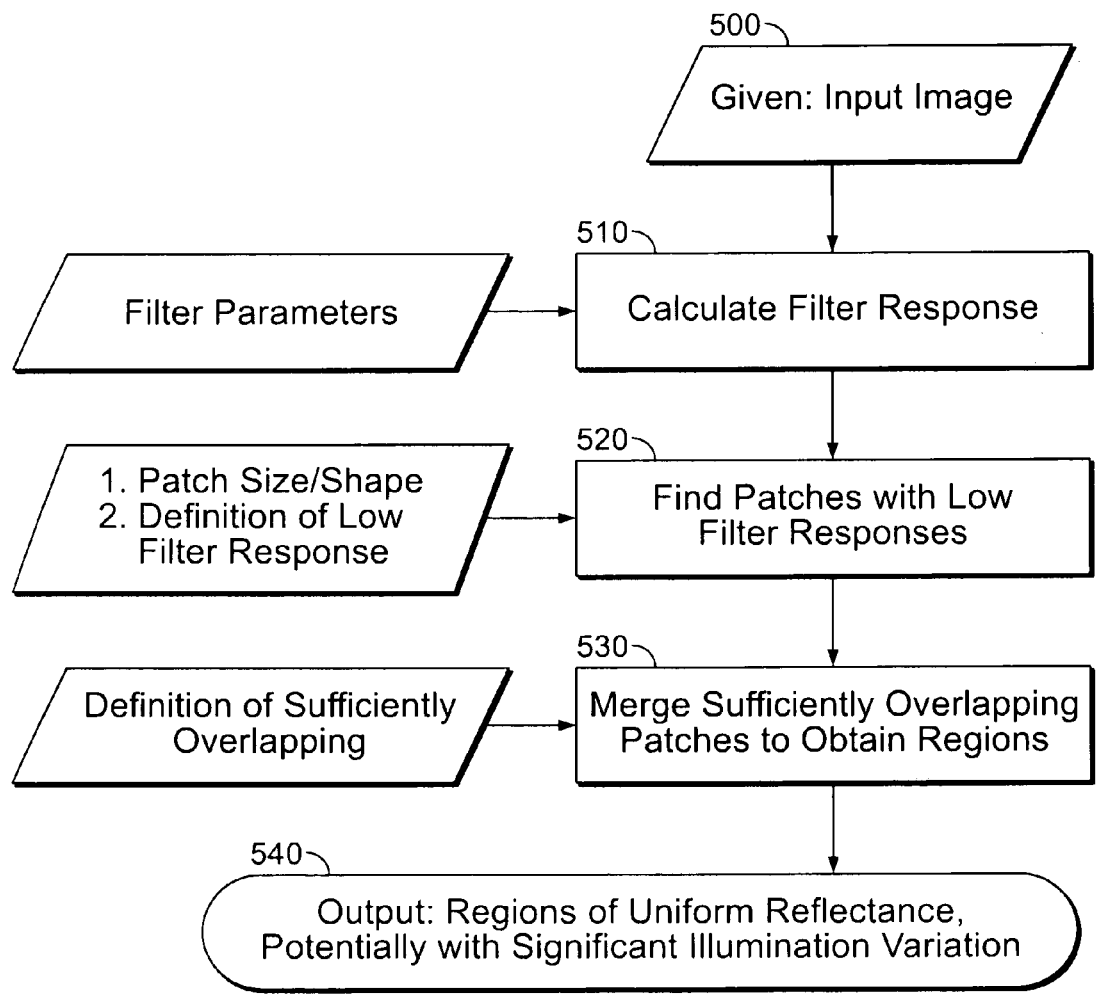
FIG. 13 is a flow chart for identifying regions of uniform material reflectance within the n×m pixel array image file of FIG. 2a, according to a feature of the present invention.

FIG. 13 is a flow chart for identifying regions of uniform material reflectance within the n×m pixel array image file of FIG. 2a, according to the filter response feature of the present invention. In step 500, an image file 18 (see FIG. 2a) is input to the CPU 12. In step 510, the CPU 12 calculates a filter response for each of the pixels p(n, m) of the image file 18. In our exemplary embodiment of the present invention, the filter response is a value proportional to the second derivative at each pixel p(n, m) of the image file 18. Such values can be calculated by the CPU 12 via a convolution of the image file 18, by the CPU 12 with a LoG filter mask, as described above in respect of FIGS. 12*b* and 12*c*.

In order to execute the filter response step, appropriate filter parameters are input to the CPU 12. In the case of a LoG filter mask, the relevant parameter is the σ factor, which determines the degree of blurring. The σ factor can range, for example, between 0.5 and 3.0.

In step 520, the CPU 12 operates to locate patches of the pixel array with filter responses that indicate uniform material reflectance among the pixels of the patch. In the example of second derivative values, a low filter response is indicative of the absence of material edges, and thus provides a high degree of likelihood that the patch encompasses a region of the image that has a uniform material reflectance, as described above. Input parameters relevant to step 520 include patch size and shape and a definition of a low filter response. Each patch can be, for example, square, rectangular, circular, and so on. In our example, each patch can comprise a 3×3 square or circular patch with a radius of 9. The CPU 12 examines a sequence of patches across the entire image file 18, with each patch being centered on a different one of the pixels p(n, m) of the array of the subject image file 18, across all the pixels of the array.

For each patch examined, the CPU 12 determines whether the filter responses of the pixels of the patch under examination, are below a threshold value. The measure can, for example, be a threshold measured against the average filter response for the pixels of the patch or a threshold measured against the maximum second derivative value among the pixels of the patch. The threshold can be determined empirically, with lower values tending to more significant segmentation (dividing the image into too many regions) and higher values leading to errors (considering two regions to be the same material reflectance when they are not). The CPU 12 lists each examined patch of the subject image file 18 that has a result below the threshold, and therefore indicates a high likelihood of uniform material reflectance within the examined patch.

In step 530, the CPU 12 operates to merge all sufficiently overlapping patches from among patches that are on the above complied list of patches indicating a high likelihood of uniform material reflectance, to compose a list of merged patches as Type B tokens. A parameter relevant to step 530 is a definition of "sufficiently overlapping." For example, the CPU 12 merges all listed patches that have 5 pixels in common, or 10 pixels in common, and so on. Given that each patch has a high likelihood of uniform material reflectance, and the patches share a number of pixels in common, it can be concluded that the two sufficiently overlapping patches have the sufficiently overlapping patches share the same material reflectance. All listed patches that overlap to the extent that they share the selected number of pixels are merged, and the merging is cumulative for mutually overlapping patches to provide the maximum extent of regions of the image having uniform reflectance. The output (540) of the routine is a list of Type B tokens, a segmentation of the image into regions of uniform reflectance. Inasmuch as each merged region may include pixels having non-zero first derivatives, each identified Type B token may encompass significant illumination variation.

Figures 14, 15:
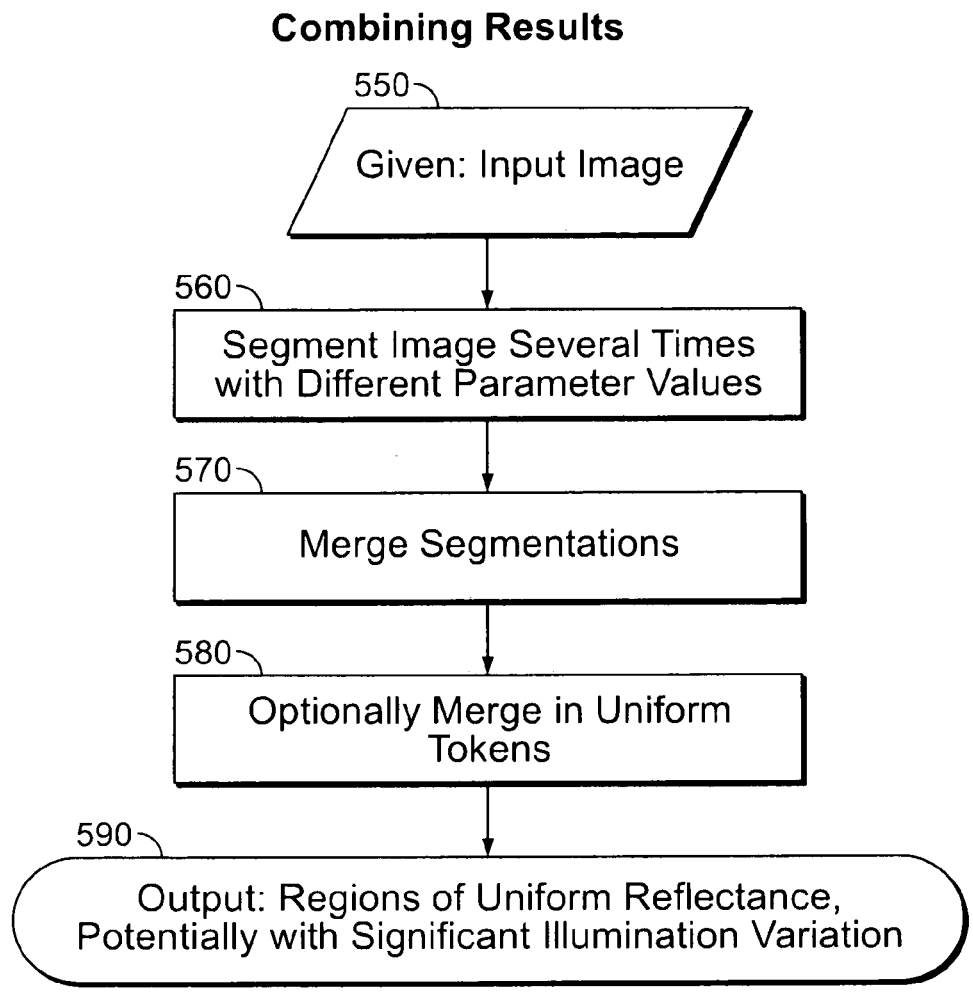
FIG. 14 is a flow chart for combining results from executions of the routine of FIG. 13 with differing parameters, according to a feature of the present invention.
FIG. 15 is a representation of an [A] [x]=[b] matrix relationship according to a feature of the present invention.

Referring now to FIG. 14, there is shown a flow chart for combining results from executions of the routine of FIG. 13 with differing parameters, according to a feature of the present invention. As noted in the description of FIG. 13, various variable parameters are input to the CPU 12. In our exemplary embodiment, the variable parameters include the σ factor, patch size and shape, a definition of a low filter response and a definition of sufficiently overlapping. Different combinations of parameters yield differing results. One set of parameters can capture some portions of an image well, with well defined Type B tokens, but leave other portions of the image in many small unconnected patches, while another set of parameters might capture different parts of the image well. Thus, by varying values within the set of parameters, and executing the routine of FIG. 13 several times, one time with each unique set of parameters, the CPU 12 can obtain several sets of segmentation results to provide a more robust overall result that is significantly improved from a result that would be obtained from any one particular set of parameters.

For example, a small patch size will localize material edges more effectively, while larger patch sizes avoid crossing gaps where edges occasionally disappear. The threshold should also be lowered as patch size and the σ factor increase, and so on. To that end, in step 550, an image file 18 is input to the CPU 12. In step 560, the CPU 12 executes the routine of FIG. 11 several times in succession, each time with a different set of input parameters.

In step 570, the CPU 12 operates to merge the results of the several segmentation operations for the subject image file 18. The merge operation can be similar to the merge step 530 of the routine of FIG. 13, for example, a merge of all identified Type B tokens that overlap by a selected number of pixels. Alternatively, the CPU 12 can implement the overlap criteria set forth below, in respect of the following description of a further exemplary embodiment of the present invention.

In step 580, the CPU 12 can optionally merge in Type C tokens identified by the CPU 12 during execution of the routine of FIG. 5*a*, as described above. In examining pixel patches for low second derivative values, the filter response technique inherently tends to avoid material edges, and thus, the technique provides Type B tokens that can fall short of image areas around edges. To "fill out" Type B tokens identified through the second derivative filter response technique, the CPU 12 can merge the identified Type B tokens that overlap previously identified Type C tokens. Again the overlap criteria can be as described above. In step 590, the CPU 12 outputs a list of Type B tokens.

In a further exemplary embodiment of the present invention, the CPU 12 (executing as the operators block 28) compiles lists of Type B tokens separately generated through each of and/or a combination of one or more of the arbitrary boundary removal, adjacent planar token merging, local token analysis and filter response techniques. The determination of the combination of techniques used depends in part on whether a particular region of the image was filtered because of texturing of the image. Since each Type B token generated through the described techniques likely represents a single material under varying illumination conditions, merging sufficiently overlapping Type B tokens generated through the use of varying and different techniques, provides a resulting, merged Type B token that represents a more extensive area of the image comprising a single material, and approaches the extent of a Type A token.

Sufficiently overlapping can be defined by satisfaction of certain pixel characteristic criteria, such as, for example:

A) The two Type B tokens have at least n of the original Type C tokens in common, for example, n=1
B) The two Type B tokens have at least n pixels in common, for example, n=20
C) The two Type B tokens have at least n % overlap, that is at least n % of the pixels in a first one of the two Type B tokens are also found in the second one of the two Type B tokens or vice versa, wherein, for example n %=10%.

D) The percentage of pixels in a smaller one of the two Type B tokens, also found in the larger one of the two Type B tokens is above a preselected threshold, for example 15%.
E) A preselected combination of criteria A-D.

Merging of two sufficiently overlapping Type B tokens can be accomplished via a mathematical operation such as execution of the union find algorithm discussed above. In the case of two overlapping Type B tokens that do not satisfy the above discussed criteria, the overlapping pixels of the two tokens can be assigned to the larger one of the two Type B tokens.

As a result of execution by the Type C tokenization block 35 and/or the operators block 28 (via the CPU 12) of the token generation and merging techniques according to features of the present invention, an image can be accurately segmented into tokens representing discrete materials depicted in the scene (Type B tokens) and tokens representing regions of robust similar color (Type C tokens), thus providing a basis for computational efficiencies, as the token representations capture spatio-spectral information of a significant number of constituent pixels. The service provider 24 stores all of the Type C and Type B tokens generated through execution of the above described token generation techniques, along with the relevant token map information, for example, as determined during execution of the adjacent planar token merging technique, and cross-references the stored operator results to the associated selected image file 18, for use in any segregation processing of the selected image.

In our example of a same illumination constraint, the service provider 24 identifies Type C and Type B tokens as the operators required by the selected constraint. The Type C tokenization block 35 generated the Type C tokens. The service provider 24 operates the operators block 28 to execute the above described techniques, to generate the relevant Type B tokens for the image 32, as well as a token map. The constraint builder 26 organizes the generated token operators according to the exemplary matrix equation, [A] [x]=[b], for input to the solver 30. In the same illumination constraint, the constraining relationship of the relevant constraint generator software module is that adjacent Type C tokens, as indicated by the token map information, are lit by the same illumination, unless the adjacent Type C tokens are part of the same Type B token.

Each Type C token stored by the service provider 24 is identified by a region ID, and includes a listing of each constituent pixel by row and column-number. Each pixel of a Type C token will be of approximately the same color value, for example, in terms of RGB values, as all the other constituent pixels of the same Type C token, within the noise level of the equipment used to record the image. An average of the color values for the constituent pixels of each particular Type C token can be used to represent the color value for the respective Type C token. Each Type B token is identified by constituent Type C tokens, and thus can be processed to identify all of its constituent pixels via the respective constituent Type C tokens.

Pursuant to a feature of the present invention, a model for image formation reflects the basic concept of an image as comprising two components, material and illumination. This relationship can be expressed as: I=ML, where I is the image color, as recorded and stored in the respective image file 18, M the material component of the recorded image color and L the illumination component of the recorded image color. The I value for each Type C token is therefore the average color value for the recorded color values of the constituent pixels of the token.

Thus: $\log(I) = \log(ML) = \log(M) + \log(L)$. This can be restated as $i = m + l$, where $i$ represents $\log(I)$, $m$ represents $\log(M)$ and $l$ represents $\log(L)$. In the constraining relationship of the same illumination constraint, in an example where three Type C tokens, a, b and c, (see FIG. 15) are adjacent (and not within the same Type B token, (as can be shown by a comparison of row and column numbers for all constituent pixels)), $l_a = l_b = l_c$. Since: $l_a = i_a - m_a$, $l_b = i_b - m_b$, and $l_c = i_c - m_c$, these mathematical relationships can be expressed as $(1)m_a + (-1)m_b + (0)m_c = (i_a - i_b)$, $(1)m_a + (0)m_b + (-1)m_c = (i_a - i_c)$ and $(0)m_a + (1)m_b + (-1)m_c = (i_b - i_c)$.

FIG. 15 shows a representation of an [A] [x]=[b] matrix equation for the mathematical relationships of the example of the three adjacent Type C tokens a, b and c described above, as constrained by the same-illumination constraint: the adjacent Type C tokens a, b and c are at the same illumination. In the matrix equation of FIG. 15, the various values for the log (I), in the [b] matrix, are known from the average recorded pixel color values for the constituent pixels of the adjacent Type C tokens a, b and c, generated by the Type C tokenization block 35 from the image selected for segregation. The [A] matrix of 0's, 1's and −1's, is defined by the set of equations expressing the selected same illumination constraint, as described above. The number of rows in the [A] matrix, from top to bottom, corresponds to the number of actual constraints imposed on the tokens, in this case three, the same illumination between three adjacent Type C tokens. The number of columns in the [A] matrix, from left to right, corresponds to the number of unknowns to be solved for, again, in this case, three. Therefore, the values for the material components of each Type C token a, b and c, in the [x] matrix, can be solved for in the matrix equation. It should be noted that each value is actually a vector of three values corresponding to the RGB color bands of our example.

Accordingly, the matrix equation of FIG. 15, as arranged by the constraint builder 26, is input by the constraint builder 26 to the solver 30 for an optimized solution for the values of the material components of the adjacent Type C tokens a, b and c of the selected image. As noted above, in the exemplary GUI embodiment of the present invention, a user selects one of several mathematical techniques for finding the optimal solution to the system of constraint equations, [A] [x]=[b]. The CPU 12 configures the solver 30 according to the mathematical operation selected by the user.

For example, in a standard least squares solver, the matrix equation is restated as underset$\{x\}$ $\{\min\}(Ax-b)^2$. The solver 30 then executes the least squares operation to determine optimized values for each of $m_a$, $m_b$ and $m_c$. The solver 30 can then proceed to generate and display a material image based upon the optimal $m_a$, $m_b$ and $m_c$ values. In the material image, the $m_a$, $m_b$ and $m_c$ values are substituted for the originally recorded RGB values, for each pixel of the respective tokens. The solver 30 can proceed to also generate an illumination image from the known recorded image values $i_a$, $i_b$, $i_c$, and the determined $m_a$, $m_b$ and $m_c$ values, utilizing the model expressed by i=m 30 1.

Each of the material and illumination images are displayed on the monitor 20, and can be stored by the service provider 24, and cross-referenced to the original image file 18.

According to a further feature of the present invention, the solver 30 can be configured to introduce factors including bounds that capture the limits of real world illumination and material phenomena, to keep material/illumination values determined by the optimization procedures as solutions, [x], to within physically plausible ranges. This can be implemented, for example, in an iterative technique to introduce additional inequality constraints on out-of-bounds values in [x], at each iteration, and executed to resolve towards values within the defined bounds. Thus, the above described least squares technique can be augmented to include minimum and maximum bounds on individual material estimates (as expressed by the entries of [x]). Moreover, the entries of [x] can be regularized such that the material estimates are consistent with a priori knowledge of material properties.

In an exemplary embodiment of the present invention, the matrices used in the least squares solver to specify the selected constraints, [A] and [b] are subject to the following bounds, expressed by the problem:
a linear least squares formulation: $\min_{x'}: \Sigma_i (A_i^T x' - t_i)^2$
subject to: $x' \geq \alpha_m 1$
$x' \leq \omega_m 1$
$x' \geq img_j$
where 1 denotes the vector of all ones, $\alpha_m$, the darkest possible material value (for example, a material cannot be darker than coal), and $\omega_m$, the brightest possible material value. The $img_j$ value is the log intensity value at a particular token j, to provide a constraint based upon the real world observation that a segregated material color cannot be darker than it appeared in the original image, since illumination can only brighten the apparent color of an observed material.

In the linear least squares formulation, the unique minimum solution for x' is the material map that minimizes, in a linear system expressed by $A^T A x' = A^T t$, the average squared difference between the target material differences $t_i$ and the estimated differences $A_i^T x'$. For example, if the "ith" constraint $A_i$ dictates that two tokens a & b are the same material, $A^T A x'$ takes the difference between the values of tokens a & b in x' and computes the distortion from the target value $t_i=0$.

The inequalities expressed by the "subject to" bounds set forth above, form a feasible set of material solutions x' which satisfy the real world constraints of possible maximum and minimum material color values. This differs from the standard, known least squares solution in that x', if not further constraint by the "subject to" bounds, could take on a value at a given location of an image (for example, at a particular pixel or token) that violates the real world observations of reflectance, yet achieves a more optimal solution for the min x' formulation.

In the optimization process executed by the solver 30, whenever any tokens have material color values that violate the "subject to" inequalities, at a particular iteration of the process, additional temporary constraints are added that pin the material values in violation, to values that satisfy the bounding conditions. Thus, the original matrices [A] and [b] are augmented with new matrices specifying the new bounding constraints $A_{bounds}$ and $b_{bounds}$ (as an expression of the "subject to" bounds) to define a new augmented system of matrix equations [A; $A_{bounds}$] [x]=[b, $b_{bounds}$]. The augmented system of equations can be solved analogously to the original system, for example, using the known least squares procedure.

In accordance with the above described bounded feature of the present invention, additional, temporary constraints are added whenever color values violate real world phenomena. A re-solving of the augmented equations can be repeated, as necessary, starting with the original system $A^T A x' = A^T t$, each time (i.e. the temporary bounding constraints need not be carried over between iterations), and iteratively solving augmented systems $A'^T A' x' = A'^T t'$ until the "subject to" bounds are satisfied.

In accordance with yet another feature of the present invention, an $L_1, L_\infty$ objective function provides a regularization of the optimized solution by encoding a preference for a small number of material changes. In effect, the $L_1, L_\infty$ solver includes the a priori belief that material maps should contain a small number of materials in a figure-of-merit. In the solver of the system, there is a distinction between the objective function, a formula that assigns a figure-of-merit to every possible solution, and the algorithm used to find a solution, an optimal value according to a given objective function. As the problem in our exemplary embodiment is stated as a minimization, $\min_{x'}: \Sigma_i (A_i^T x' - t_i)^2$, the value an objective function assigns can be characterized as a "cost."

In our problem, let x' be a matrix of a number of rows of tokens and a number of columns of color bands, where $x'^c$ denotes the $c^{th}$; column associated with the $c^{th}$ color band. The least squares objective function, in formula, is augmented, as follows:

$$\min_{x'}: \Sigma_c \Sigma_i (A_i^T x'^c - t^c i)^2 + \gamma \Sigma_{k|tk} \max_c |A_k^T x'^c|$$

where $\gamma | \gamma > 0$ governs the trade-off between the cost associated with the least squares term and the $L_1, L_\infty$ penalty. The expression $\Sigma_{k|tk} \max_c |A_k^T x'^c|$ accumulates the maximum per-channel absolute difference over all the same material constraints in [A].

For example, given a same material constraint between tokens a & b, the $L_1, L_\infty$ function will only include a term for a color channel with the largest difference in between $x^c_a$ and $x^c_b$ over color channel c. In an exemplary embodiment of-the present invention, the optimization procedure, for example as expressed by the objective function $\min_{x'}: \Sigma_c \Sigma_i (A_i^T x'^c - t^c i)^2 + \gamma \Sigma_{k|tk} \max_c |A_k^T x'^c|$, is a shrinkage technique. That is, a sequence of least squares problems is solved in a manner wherein, at each round, constraint targets determined to violate the same material constraint are shrunk. At the end of the sequence, constraints with a value below a given threshold are culled from the constraint system, and a new least squares solution is computed. It should be noted that bounds such as the "subject to" bounds discussed above, can be added to the objective function to provide a bounded $L_1, L_\infty$ solver.

Figure 16A:
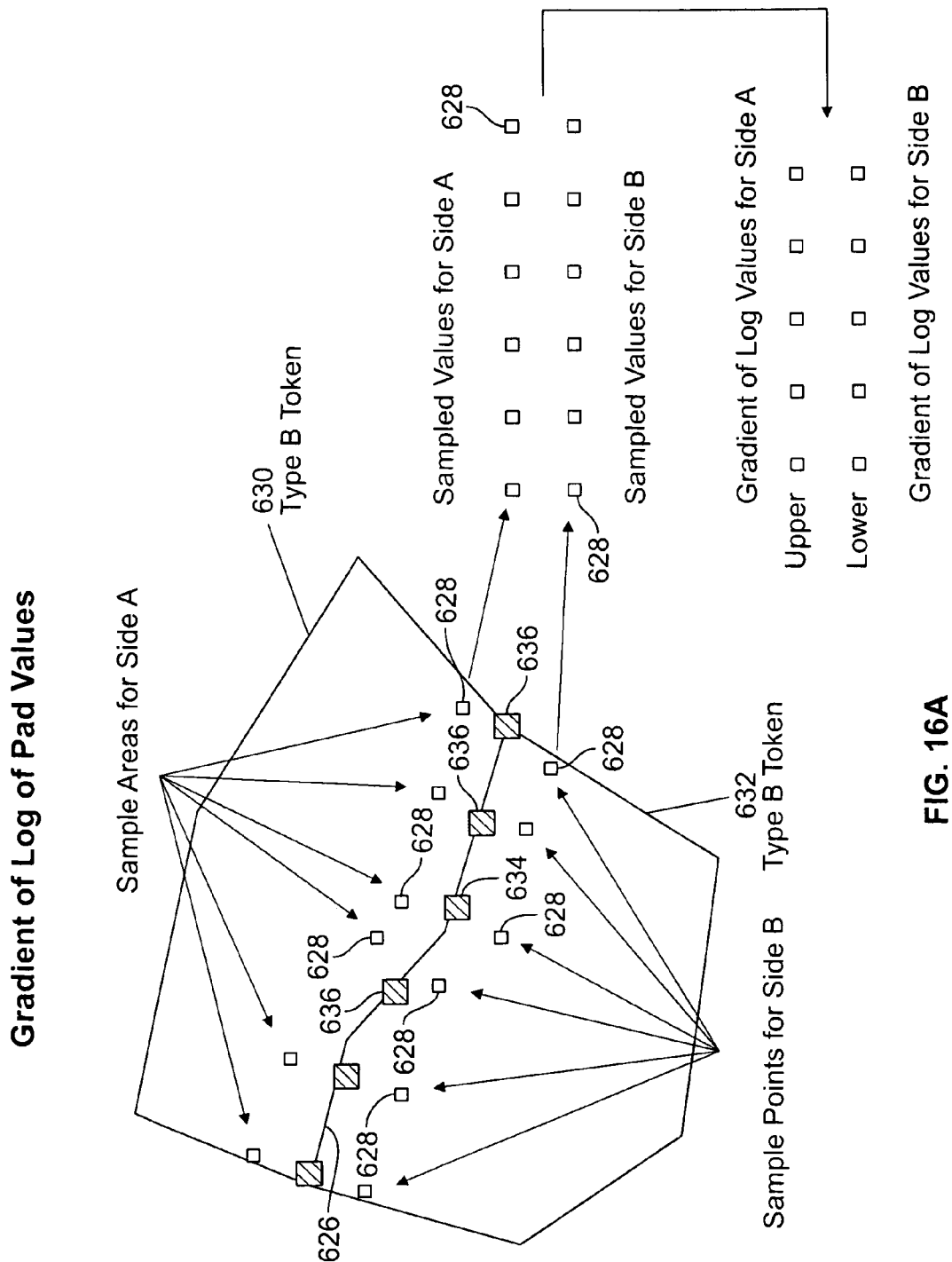
FIG. 16a shows a representation of a boundary between two Type B tokens of FIG. 5d, according to a feature of the present invention.
Figure 16B:
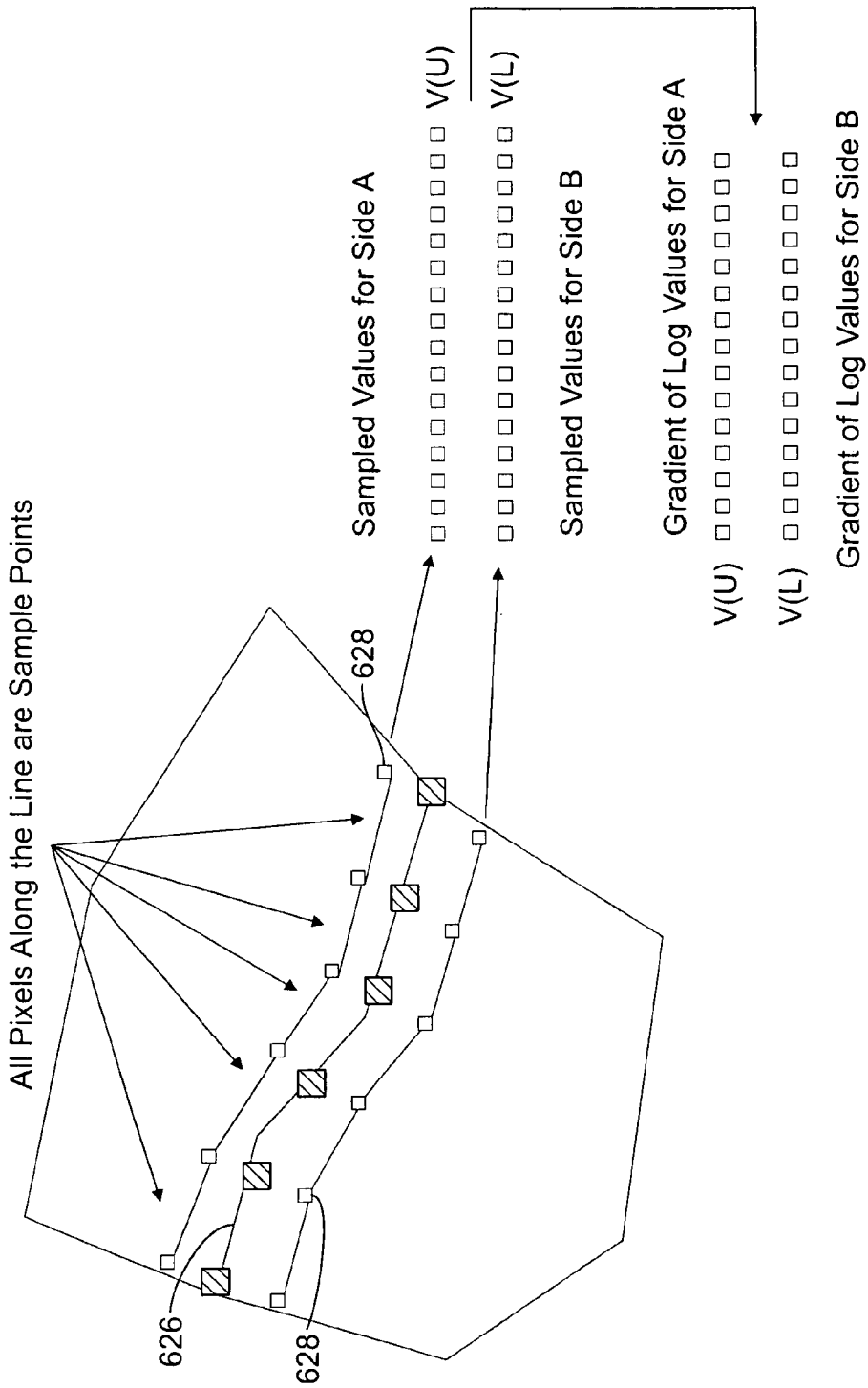
FIG. 16b shows another representation of a boundary between two Type B tokens of FIG. 3d, according to a feature of the present invention.
Figure 16C:
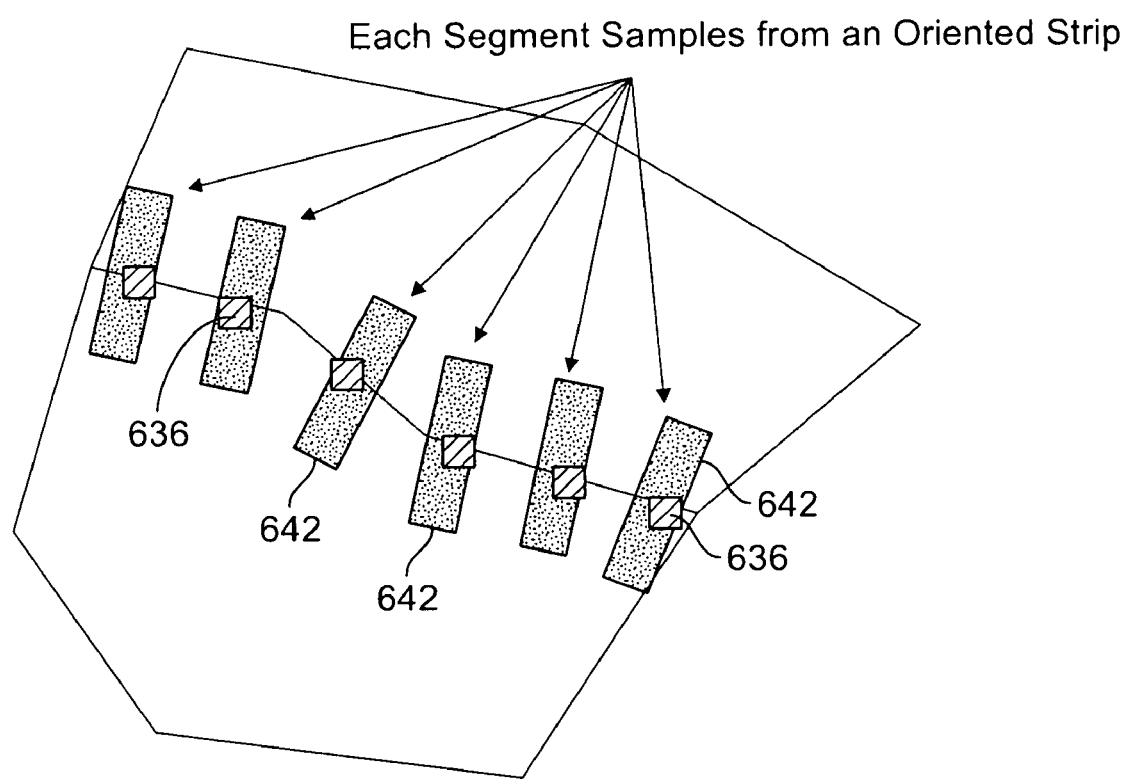
FIG. 16c shows yet another representation of a boundary between two Type B tokens of FIG. 3d, according to a feature of the present invention.

FIGS. 16a, 16b and 16c illustrate examples of a boundary representation spatio-spectral operator. An analysis of pixels within the illustrated representations provides information on a color ratio between the regions of the image forming the respective boundary, for use in a boundary representation constraint.

Referring to FIG. 16a, there is shown a detail of a boundary 626 between two of the Type B tokens of FIG. 5d. According to a feature of the present invention, a representation of the boundary 626 is constructed from contiguous pixels located at the boundary 626 and extending within each of the Type B tokens defining the boundary 626. The pixel representation is configured to provide samples of pixels relevant to the boundary, for example, pixel arrays comprising pads 628 within each of the Type B tokens forming the boundary 626, that can be subject to spatio-spectral analysis as a function of respective color values (for example, R, G, B values) of the pixels provided by the pads 628. The samples are compared to determine the likelihood of the boundary 626 corresponding to a material change. The CPU 12 is operated to generate the pad configuration by traversing perimeter pixels of a first Type B token 630, and determining the distance to a corresponding perimeter pixel of the Type B token 632 on the opposite side of the boundary 626.

When a closest distance between perimeter pixels is located, that location is then used as a starting point for generation of the representation. A pixel 634 (size exaggerated in the drawing for illustration purposes) in the exact middle of the located closest distance between corresponding perimeter pixels of the Type B tokens 630,632 defines a first segment of the representation. The CPU 12 then traverses pixels in a direction perpendicular to the boundary 626, within the Type B token 630 for a number of pixels, for example 10-12 pixels, from the pixel 634. At that location, the CPU 12 identifies one of the pads 628 as an array of pixels, for example, a 3×3 pixel array, around the location 10-12 pixels distant from the pixel 634. The CPU 12 repeats the same operation in respect of the Type B token 632 to define a pair of pads 628, one on either side of the pixel 634, and one pad 628, each in one of the Type B tokens 630,632, forming the boundary 626.

Upon the completion of a first segment comprising a pair of pads 628, the CPU 12 generates a series of additional pad pairs along the entire length of the subject boundary 626. To that end, the CPU 12 identifies boundary pixels 636, on either side of the pixel 634, separated from one another by a fixed number of pixels, for example 5 pixels, and each arranged in the boundary between perimeter pixels of the Type B tokens 630,632. For each boundary pixel 636, the CPU 12 identifies a pair of pads 628, one on either side of the respective pixel 636, and one pad 628, each in one of the Type B tokens 630,632, forming the boundary 626, in the same manner as executed in respect of the pair of pads around the pixel 634.

According to a feature of the present invention, the CPU 12 performs a series of spatio-spectral tests on the pixels of the representation, including calculations to generate data indicating the likelihood as to whether the boundary change is a material change.

A first test comprises a log of gradient match. The test examines a matching between the gradients parallel to the border on each side (upper and lower sides of the representation shown in FIG. 16*a*) of the representation. The log of the gradients is used to account for materials with different intensities. The CPU 12 operates to:
1. Initialize a sum variable to zero, E=0;
2. For each pad 628
   (a) For each side, calculate the difference between the mean color value of the current pad and a next pad (gradient);
   (b) For each side, take the log of the difference (log of gradient);
   (c) Calculate the sum-squared difference between the upper and lower logged differences (with respect to the upper pads 628 and lower pads 628 of the representation shown in FIG. 16*a*);
   (d) Add the value to E;
3. Convert E to a mathematical pseudo-likelihood, for example:

$$L = \frac{1.0}{1.0 + 10.0 e^{500(E-0.015)}}$$

A next test comprises a matching of the left and right side gradients using dynamic time warping (DTW). In this test the CPU 12 operates to:
1. For each pad pair of the representation:
   (a) For each side, trace a line parallel to the boundary 626, from pad location to pad location (see FIG. 16*b*);
   (b) For each side, upper and lower, add the points of the respective line to a vector, either $V_{(U)}$ or $V_{(L)}$ (see FIG. 16*b*);
   2. Compute the log of the gradient of each of $V_{(U)}$ and $V_{(L)}$, put the results in $\nabla V_{(U)}$ and $\nabla V_{(L)}$;
   3. Compare $\nabla V_{(L)}$ with $\nabla V_{(R)}$ using dynamic time warping to produce an error measure E;
   4. Convert E to a mathematical pseudo-likelihood, for example:

$$L = \frac{1.0}{1.0 + 10.0 e^{1000(E-0.01)}}$$

In a third test, the CPU 12 executes a log space matching operation:
1. For each side (FIG. 16*a*), collect all of the mean color values of the pads 628 into a vector and sort it according to pixel intensity;
2. For each side, select the 5th percentile and 95th percentile pixels as dark and light examples, respectively;
3. For each side, calculate the Euclidean distance between the log of the bright and dark pixels, $D_{(R)}$ and $D_{(L)}$;
4. Compute the difference between the two distances, $E_{(1)} = D_{(R)} - D_{(L)}$;
5. Convert $E_{(1)}$ to a mathematical pseudo-likelihood, for example:

$$p(1) = e^{-10 \, (\text{square of } E(1))}$$

6. For each side, calculate the primary eigenvector for the covariance matrix of the border pixels using, for example, singular value decomposition [SVD];
7. Calculate the dot product of the two primary eigenvectors (one for each side) and put the result in $E_{(2)}$;
8. Convert $E_{(2)}$ into a pseudo-likelihood, for example, use it directly $p_{(2)} = E_{(2)}$;
9. Combine the length and orientation likelihoods to produce a final pseudo-likelihood: $L = p_{(1)} p_{(2)}$.

In a fourth test, the CPU 12 executes a multi-scale ratio matching for each centipede pad pair. The CPU 12 operates to:
1. For each side (FIG. 16*a*), collect all of the mean color values of the pads 628 into a vector, sorted by their order along the border;
2. Initialize a collection variable P and a counter variable N;
3. For each pad i:
For each distance d from, for example, 1 to 3:
   i. If each band of pad i on one side is brighter than its counterpart on the other side and each band of pad i+d exhibits the same relationship between sides
      Calculate the probability p that the reflectance ratio between the upper and lower pads at location i is equivalent to the reflectance ratio for the upper and lower pads at location i+d using a noise model (for example, a linear noise model that takes into account a constant term and a term that is linear in image intensity);
      Add the result p to the collection variation P
      Increment the counter variable N
   ii. Otherwise, if the colors at the two pad locations are not similar, for example, have a ratio in some color band greater than R(m)ax (e.g. 1.3) or less than $R_{(m)}$ in (e.g. 0.77) add 0 to P and increment the counter variable N;
4. If N>0 calculate a pseudo-likelihood from P and N, for example, L=P/N;
5. Otherwise set the likelihood to zero L=0.

In a further test, the CPU 12 utilizes a bi-illuminant dichromatic reflection model (BIDR model) of the image. According to a prediction of the BIDR model, if all the pixels of two Type B tokens are from a single material under a direct/ambient pair of illuminants, then the pixels will be well represented by a line in RGB space. A pad linearity test can be devised to determine how well the mean color values of the pads 628 on either side of the representation (FIG. 16a) approximate a line in RGB space. In the pad linearity test, the CPU 12 operates to:
1. For each side s∈{left, right}
   (a) Collect the mean color values of the pads 628 into a vector;
   (b) Calculate first and second eigenvectors ($e_{(1)}$, $e_{(2)}$) and eigenvalues of the covariance matrix, for example, using SVD;
   (c) Calculate the ratio of the first to the second eigenvector $R=e_{(1)}/e_{(2)}$, if the second eigenvalue is zero, let R=20, unless the first eigenvector is also zero, in which case R=0;
   (d) Convert the ratio into a mathematical pseudo-likelihood, for example, using:

$$R_s = \left(\frac{1}{e^{-a(R-c)}} - f\right)\frac{1}{1-f}$$

where:

$$f = \frac{1}{1+e^{ac}}$$

and example values for the constants are α=12 and c=0.5;
   (e) Project each pad mean value onto the first eigenvector and calculate the minimum and maximum distance along the eigenvector, $D_{(min)}$ and $D_{(max)}$;
   (f) Divide the distance $D_{(max)}-D_{(min)}$ into K bins (e.g. K=5);
   (g) Build a histogram of how many pixels at are at each distance along the first eigenvector;
   (h) Count how many bins have no more than C pixels in them (e.g. C=0) and store the result in $E_{(s)}$.
2. Convert the calculated pseudo-likelihoods into a single pseudo-likelihood using, for example:

$$L=R_{(left)}R_{(right)}(E_{(left)}E_{(right)})^{0.7}$$

In a sixth test, the CPU 12 performs a test to determine whether the pads 628, on each side of the representation (FIG. 16a), corresponds to a reasonable direct/ambient illuminant pair of the bi-illuminant. In this test, the CPU 12 operates to:
1. For each side s∈{left, right}
   (a) Collect all of the mean color values of the pads 628 into a vector;
   (b) Calculate the primary eigenvector $e_{(1)}$ of the covariance matrix of the pixels, for example, using SVD;
   (c) If the elements of $e_{(1)}$ do not all have the same sign, let $R_{(s)}=1$;
   (d) Otherwise, multiply $e_{(1)}$ by either 1 or −1 so that it is all positive and calculate its saturation:

$$R_{(s)}=\max(R,G,B)-\min(R,G,B)/\max(R,G,B);$$

(e) Convert $R_{(s)}$ to a pseudo-likelihood using, for example:

$$L_s = 1.0 - \frac{1.0}{1.0+e^{-a(R_s-M)}}$$

where example values for the constants are α=25 and M=0.65.

In a yet further test, the CPU 12 tests for a degree of variation among the mean color values of the pads 628 on each side of the representation (FIG. 16a). The greater the degree of variation, the greater the amount of information relevant to the nature of the boundary change. The CPU 12 operates to:
1. For each side, calculate the minimum, maximum and average intensities of the mean color values of the pads 628;
2. For each side, calculate a normalized variation as $V_{(side)}$=(maximum−minimum)/average;
3. For each side, convert the normalized variation to a pseudo-likelihood using, for example:

$$L_{side} = \frac{1.0}{1.0+e^{-alpha(V_{side}-M)}}$$

where example values for the constants are α=25 and M=0.4.
4. Combine the pseudo-likelihoods for each side using, for example, $$L=L_{(left)}L_{(right)}.$$

A next test comprises a strip token test. The CPU 12 calculates a strip token representation, comprising a series of strip tokens 642 (see FIG. 16c), one per boundary pixel 636 and each extending 8-10 pixels from the respective boundary pixel and 2-4 pixels in width. The CPU 12 analyzes the sharpness of the strip token 642 on each side, where sharpness is defined as the maximum difference between two adjacent pixels in the strip as a fraction of the maximum change over the entire strip. The CPU 12 operates to:
1. Generate a set of strips of pixels (e.g. 2×8 pixels in size), that are centered along the border and oriented to be perpendicular to it (see FIG. 16c);
2. For each strip, calculate its sharpness as the ratio of the maximum difference between any two adjacent pixels in the strip to the difference between the maximum and minimum intensity pixels within the strip;
3. Calculate the average sharpness over all strips;
4. Return the average sharpness (S) as a pseudo-likelihood.

In a next strip token test, the CPU 12 performs an analysis of the linearity of each strip. The CPU 12 operates to:
1. Generate a set of strips of pixels (e.g. 2×8 pixels in size, see FIG. 16c), that are centered along the border and oriented to be perpendicular to it;
2. For each strip, calculate its degree of linearity using the ratio of the first and second eigenvalues of the covariance matrix of the pixels within the strip;
3. For each strip i, convert its linearity $l_{(i)}$ into a pseudo-likelihood using, for example:

$$L_i = \frac{1.0}{1+e^{-a(l_i-C)}}$$

where example values for the constants are α=0.5 and C=10.

In yet another strip token test, the CPU 12 examines how the image changes perpendicular to each strip token. The CPU operates to:
1. Generate a set of N strips of pixels (e.g. 2×8 pixels in size) (see FIG. 16c);
2. Initialize a counter C=0;

3. For each strip, identify the edge pixels on the strip
   (a) For each edge pixel p:
      i. Examine M pixels in a line perpendicular to the long axis of the strip
      ii. For each of the M pixels, calculate the similarity to the edge pixel p using a noise model
      iii. If any of the Mpixels differs from p, consider the strip to have failed the test and increment C;
4. Convert the count of failed strips to a pseudo-likelihood by calculating the percentage that failed L=C/N.

Upon completion of the set of tests for feature calculation, the CPU 12 executes a computer learning technique to analyze the mathematically determined pseudo-likelihood data accumulated via the test operations of the CPU 12. The CPU 12 forms a feature vector from the various likelihoods L determined in the tests. The CPU 12 is then operated to learn a classifier that can make a decision about whether the feature vector indicates a boundary that is most probably a material boundary rather than another type of boundary, for example, an illumination edge, depth boundary or simultaneous illumination and material change. For example, a neural network with an input for each pseudo-likelihood can be trained to output a decision. Other example methods include support vector machines [SVM], Bayesian decision trees, or boosting. Upon a determination of a likelihood that the boundary is a material boundary, the ratio X can be determined for the colors of the materials of the Type B tokens forming the boundary, and applied as a constraint to bordering Type C tokens, as described above.

Figure 17:
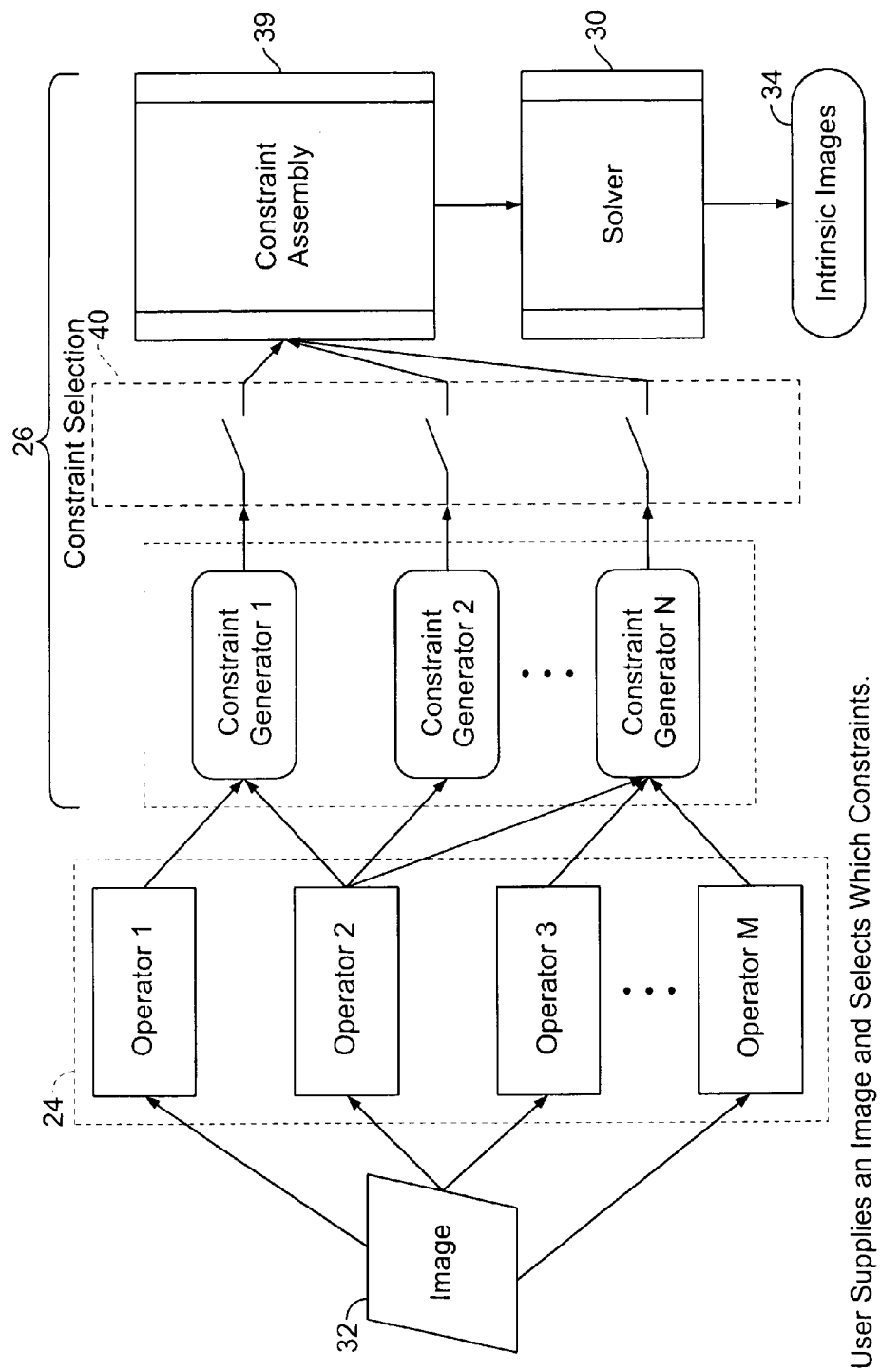
FIG. 17 is a functional block diagram for a service provider component for use in the image segregation system architecture of FIG. 3.

FIG. 17 is a generalized functional block diagram for the service provider 24 and constraint builder 26. To summarize the above described constraint examples in a general scheme, a selection is made of an image 32, and a number of constraint generators from a set of constraint generators 1, 2, ... N, (the constraint generator software modules) for example, by a user, via the GUI. The set of constraint generators 1-N includes the constraints described above, and any additional constraining relationships developed as a function of spatio-spectral information for an image. The above described set of constraints is provided as an example. The present invention contemplates any constraining relationship based upon spatio-spectral operators, that provides a logical deduction regarding material and illumination aspects of an image, and thus a basis for constructing matrices [A] and [b] to define a set of equations whose optimal solution captures intrinsic illumination and material components of a given image.

Likewise, a set of operators 1-M, generated by the Type C tokenization block 35 or the operators block 28, includes all operators defined in the constraint generator modules 1-N. As shown in FIG. 17, the service provider 24 provides all of the operators 1-M, as required by the selected constraint generators 1-N and further couples the selected constraint generators 1-N to a constraint assembly 39 via a logical switch 40 (both configured within the constraint builder 26). In the event any of the operators 1-M for a selected image 32 are not already stored by the service provider 24, the service provider 24 utilizes the operators block 28 to compute such operators on demand, in the manner described above. The constraint assembly 39 constructs a separate [A] [x]=[b] matrix for each one of the selected constraint generators, as a function of the operators and the constraining relationships defined in the respective constraint generators 1-N. In each case, the [A] [x]=[b] matrix is constructed in a similar manner as described above for the same illumination example.

Upon completion of the construction of the system of equations $[A]_i [x]=[b]_i$, for each of the selected constraint generators, i={1, 2, ... N}, the constraint assembly 39 concatenates the constituent matrices $[A]_i$, $[b]_i$, from each constraint generator. Since each of the concatenated equations may contain a different subset of the unknowns, [x], the assembly is performed such that corresponding columns of individual matrices $[A]_i$, that constrain particular unknowns in [x], are aligned. The concatenated matrices, [A] [x]=[b], are then input to the solver 30, for solution of the unknowns in the complete [x] vector, pursuant to the selected optimization procedure, for output of intrinsic images 34. The individual constraints within the concatenated matrices, [A] [x]=[b], can be weighted relative to one another as a function of factors such as perceived importance of the respective constraint, strength or empirically determined confidence level.

The above described example of a same illumination constraint utilizes Type C token and Type B token spatio-spectral operators. These token operators provide an excellent representation of images that include large surface areas of a single material, such as are often depicted in images including man-made objects. However, in many natural scenes there are often large areas of highly textured regions, such as sand, grass, stones, foliage, and so on. As noted above, identification of Type B tokens using Type C tokens, can be difficult in an image texture. According to a further feature of the present invention, a texton histogram operator provides a mechanism for capturing statistically uniform spatial variations of textured regions in a manner that is useful in a constraint based optimization, for example, as expressed by the [A] [x]=[b] matrix equation.

Thus, according to this feature of the present invention, rather than generating Type C tokens in textured regions of an image, from intensity histograms, for use in identifying Type B tokens, as described above, texture tokens are generated as a species of Type B tokens, for use in a constraint. In an exemplary embodiment of the texton histogram operator, the operators block 28 converts each pixel of the image (or pixels of those regions of an image identified as comprising a texture) from the recorded color band representation of the respective image file 18, such as, for example, RGB color band values, to a two band representation wherein the two bands comprise a texton label and a texton histogram label. The two band representations for the pixels are then used to identify texture tokens, as will appear.

A texton label for each pixel is generated through execution of a clustering process. A texture can be characterized by a texture primitive (for example, in a grass texture, a single blade of grass), and the spatial distribution of the primitive. A texton analysis is an analytical method for characterizing a texture primitive, for example via a clustering algorithm. Clustering is a process for locating centers of natural groups or clusters in data. In an exemplary embodiment of the present invention, the data comprises pixel patches selected from among the pixels of an image being segregated into material and illumination components. For example, 3×3 pixel patches are clustered into K different groups, with each group being assigned a designating number (1,2,3, ... K). The texton label for each pixel of the 3×3 array is the group number of the group to which the respective patch was assigned during the clustering process.

To expedite execution of a clustering algorithm, random samples of 3×3 patches can be selected throughout the image, or region of the image identified as comprising a texture, for processing in a clustering algorithm. After execution of the clustering algorithm by the CPU 12 (operating as the operators block 28), each 3×3 patch of the image is assigned the texton label of the closest one of the K group centers identified in the clustering process, as executed in respect of the selected random samples.

To advantage, prior to execution of a clustering algorithm, the pixels of the image are subject to an image intensity normalization. In a clustering process utilizing an intensity-based distance matrix, dark areas of an image may be placed in a single group, resulting in an under representation of groups for shadowed areas of a textured region of an image. A normalization of the image provides a more accurate texton representation for texture regions under varying illumination. A normalized intensity for a pixel can be expressed by:

$$i_{norm}(n,m) = \log(i(n,m)/i_b(n,m)),$$

where $i_{norm}(n,m)$ is the normalized intensity for a pixel p(n, m), i(n,m) is the intensity for the pixel p(n,m), as recorded in the image file 18, and $i_b(n,m)$ is a blurred or low passed filtered version of the pixel p(n,m). For example, a 10 pixel blur radius can be used in any standard blurring function.

Clustering can be executed according to any known clustering algorithm, such as, for example, K means clustering where there are K clusters or groups $S_i$, i=1,2, . . . K, and $\mu_i$ is the mean point or center point of all the data points $x_j \in S_i$. In our example, each $x_j$ comprises a selected 3×3 pixel patch arranged as a 9×1 vector of the nine pixels in the patch (27 elements total, including the RGB values of each of the nine pixels of the vector). As noted above, each mean point $\mu_i$ is assigned a texton label, 1, 2, 3 . . . K, that becomes the texton label for any pixel of a 3×3 patch clustered into the group for which the respective mean point is the center.

According to an exemplary embodiment of the present invention, the CPU 12 executes the algorithm by initially partitioning the selected 9×1 vectors, representing 3×3 pixel patches of the image, into K initial groups $S_i$. The CPU 12 then calculates a center point $\mu_i$, for each group $S_i$ utilizing an intensity-based distance matrix. After determining a center point $\mu_i$, for each group $S_i$, the CPU 12 associates each 9×1 vector to the closest center point $\mu_i$, changing groups if necessary. Then the CPU 12 recalculates the center points $\mu_i$. The CPU 12 executes iterations of the steps of associating each 9×1 vector to the closest center point $\mu_i$, and recalculating the center points $\mu_i$, until convergence. Convergence is when there is no need to change the group for any of the 9×1 vectors. At that point, the CPU 12 assigns the group number for the respective center point $\mu_i$, as the texton label for the pixels of each vector in that group.

As noted above, pixels of 3×3 patches not selected as samples for clustering are assigned the texton label of the closest one of the K group centers $\mu_i$, identified in the clustering process, as executed in respect of the selected random samples. A texton label map is stored by the service provider 24, and is coextensive with the pixel array of FIG. 2. In the texton label map, for each pixel location, there is an indication of the respective texton label.

Upon completion of the texton label assignment for pixels of the image, the CPU 12 operates to generate a texton histogram for each pixel to provide a representation of the spatial variation of texton representations within a textured region of the image. To that end, the CPU 12 accesses the texton label map. At each pixel location within the texton label map, a pixel patch of, for example, 21×21 pixels, is set up around the current location. The 21×21 patch size is far greater than the 3×3 patch sized used to generate the texton representations, so as to capture the spatial variations of the texture. A texton histogram is then generated for the pixel location at the center of the 21×21 patch, in a similar manner as the intensity histogram described above. However, rather than bins based upon color band values, in the texton histogram, there is a bin for each texton label value, 1, 2, 3. . . K. The count for each bin corresponds to the number of pixels in the 21×21 patch having the texton label value for the respective bin.

When a texton histogram is generated for each pixel of the texton label map, the CPU 12 executes a second clustering step. In the second clustering step, the texton histograms are clustered using spectral clustering. Spectral clustering techniques use a spectrum of a similarity matrix of data of interest, (in our example, the texton histograms) to reduce the dimensionality for clustering in fewer dimensions. A similarity matrix for a given set of data points A can be defined as a matrix S where $S_{ij}$ represents a measure of the similarity between points i, j∈A. In our example, eigenvectors of the Laplacian are clustered using a mean shift. The distance metric is a chi-squared distance of the histograms.

A texton histogram label (1,2 . . .) is assigned to each cluster group defined by the clustering procedure. For each pixel of the texton label map, the texton histogram label for the cluster group corresponding to a texton histogram that is nearest the texton histogram for the respective pixel, is assigned to that pixel. Distance is defined as the chi-squared histogram distance. Upon completion of the assignment of a texton histogram label to each pixel, each pixel is now represented by a two band, texton label, texton histogram label representation.

According to a feature of the present invention, the two band, texton label, texton histogram label representations for pixels of an image file 18 can be utilized in a constraint for construction of an $[A]_i[x]=[b]_i$ constituent within the concatenated matrices, [A] [x]=[b]. For example, it can be assumed that a region of an image wherein contiguous pixels within the region all have the same two band, texton label, texton histogram label representation, comprises a region of the same mean material of a texture depicted in the image. Such a region can be referred to as a texture token, a species of a Type B token. Thus, a constraint can be imposed that all Type C tokens within the same texture token are of the same mean material. In this constraint, the Type C tokens are the Type C tokens generated from the color band values of the constituent pixels by the Type C tokenization block 35.

While the above exemplary embodiment of the present invention has been described with a user selecting constraint generators and mathematical operations via a GUI, the image segregation processing can be done in other operating modes, such as automatically, with images, constraint generators and mathematical operations being automatically selected, for example, as a function of image parameters.

Figure 18:
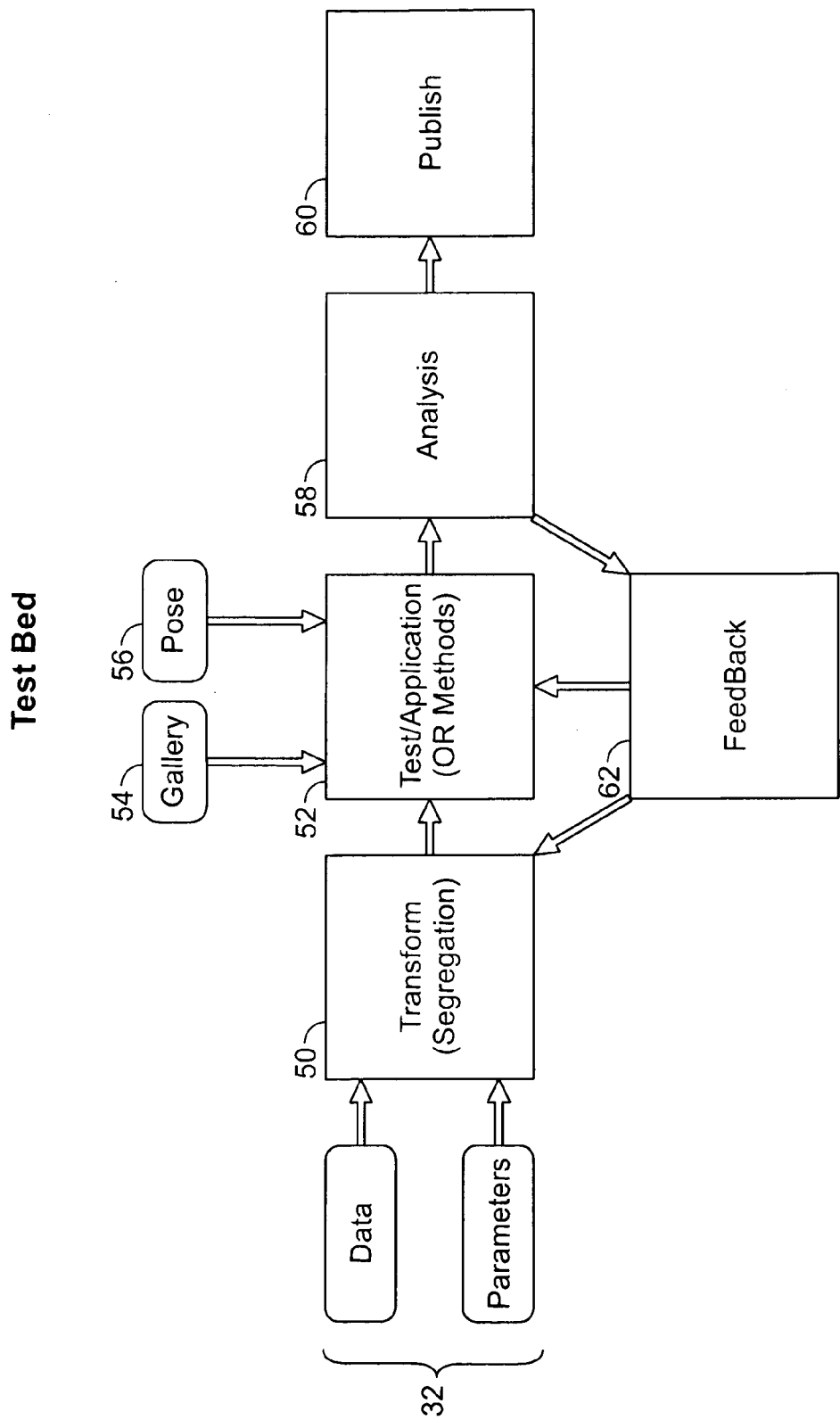
FIG. 18 is a block diagram for a test bed for testing an image transform method such as the image segregation system architecture of FIG. 3.

Referring now to FIG. 18, there is shown a block diagram for a test bed for testing an image transform method such as the image segregation system architecture of FIG. 3. The test bed is utilized to test image segregation operations in order to ascertain and set automatic selections. The input 32 comprises data and parameters, such as an image file 18 as data and its associated parameter data file. A transform component 50, in our example, comprises the image segregation system architecture of FIG. 3, which operates to transform the data by generating intrinsic images corresponding to the image of the input image file 18. The intrinsic images include a material image and an illumination image, as described above.

According to a feature of the present invention, the generated intrinsic images are input to a test/application module 52 that utilizes the intrinsic images as an input. The test/application module 52 in our example is an object recognition method. The object recognition method can comprise any known object recognition method such as a feature-based learning framework, an appearance-based learning framework, shape-based analysis and classification, and model-based object recognition. In a test sequence, a gallery 54 comprising a set of images of known objects is input together with a probe 56, which comprises the image file 18 input to the transform component. The object recognition method is performed on each of the probe and the intrinsic images, to ascertain, for example, an improvement in recognition ability as between an image and its corresponding intrinsic images.

All test results are input to an analysis module 58 that operates to compile all object recognition results for a series of probes and corresponding intrinsic images. The compilation is published by publish module 60, and also output to a feedback loop 62. The feedback loop 62 controls each of the transform component 50 and test/application modules 52 to perform operations on a same image under differing selections of constraint generators, mathematical optimization operations and variable parameters.

For example, in our exemplary embodiment of a filter response to identify Type B tokens, the variable parameters to be used in a segregation operation of the transform component 50 include the a factor, patch size and shape, a definition of a low filter response and a definition of sufficiently overlapping. Different combinations of parameters yield differing results. One set of parameters can capture some portions of an image well, with well defined Type B tokens, but leave other portions of the image in many small unconnected patches, while another set of parameters might capture different parts of the image well. Thus, by varying values within the set of parameters, several sets of segmentation results can be obtained to provide more robust overall result for analysis and comparison. Moreover, the particular object recognition method utilized can also be varied in the test/application module 52 for analysis of various object recognition method/parameter combinations and their impact on results.

Domain knowledge can also be correlated to different constraints and optimization processes to ascertain automatic settings for certain types of images. For example, for an image depicting an exterior scene with extensive green lawns taken in winter at 3:00 PM, operations can be performed by each of the transform component 50 and test/application module 52, with various different constraints, optimization processes, variable parameters, object recognition methods and so on, and analyzed to determine empirically, a best setting for such images. To that end, a known learning algorithm can be implemented in the feedback loop 62. For a selected set of different constraints, the weight of each can be varied to ascertain an optimal weight for each selected constraint.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
   providing an image;
   generating spatio-spectral operators for the image;
   defining a constraint between the spatio-spectral operators; and
   performing an optimization operation as a function of the constraint to generate an intrinsic image corresponding to the image, the intrinsic image comprising a representation of one of material or illumination, expressed as a separate, multi-band representation for the one of material or illumination, independent of the other of the material or illumination, wherein each band corresponds to a segment of the electro-magnetic spectrum.

2. The method of claim 1 wherein the step of performing an optimization operation is carried out by performing a convex optimization operation.

3. The method of claim 1 wherein the step of performing an optimization operation includes the further step of introducing factors established as a function of real world illumination and material phenomena, to keep material/illumination values determined in the optimization operation, to within physically plausible limits.

4. The method of claim 3, wherein the factors include bounds.

5. An automated, computerized method for processing an image, comprising the steps of:
   providing an image;
   generating spatio-spectral operators for the image, wherein the spatio-spectral operators comprise operators selected from the group consisting of tokens, token map information, log chromaticity representation values, X-junctions, BIDR model representations, textons, and combinations thereof;
   defining a constraint between the spatio-spectral operators; and
   performing an optimization operation as a function of the constraint to generate an intrinsic image corresponding to the image.

6. An automated, computerized method for processing an image, comprising the steps of:
   providing an image;
   generating spatio-spectral operators for the image;
   defining a constraint between the spatio-spectral operators, wherein the constraint comprises a constraint selected from the group consisting of an anchor constraint, a same illumination constraint, a smooth illumination constraint, a Type B token constraint, a Linear token constraint, a BIDR enforcement constraint, a same texton histogram constraint, a log chromaticity similarity constraint, an X junction constraint, and combinations thereof; and
   performing an optimization operation as a function of the constraint to generate an intrinsic image corresponding to the image.

7. An automated, computerized method for processing an image, comprising the steps of:
   providing an image;
   organizing spatio-spectral information for the image in a matrix equation expressed by:
   [A] [x]=[b], wherein [A] expresses values determined by a constraining relationship imposed upon the spatio-spectral information, [b] expresses recorded information for the image, and [x] expresses an unknown material/illumination component of the image;
   performing an optimization operation to determine a solution for the equation; and
   utilizing the solution to generate an intrinsic image corresponding to the image.

8. The method of claim 7 wherein the step of performing an optimization operation is carried out by performing an optimization operation selected from the group consisting of a least squares solver and a preconditioned conjugate gradient solver.

9. The method of claim 7 wherein the step of performing an optimization operation includes the further step of introducing factors established as a function of real world illumination and material phenomena, to keep material/illumination values determined in the optimization operation, to within physically plausible limits.

10. The method of claim 9, wherein the factors include bounds.

11. The method of claim 10, wherein the step of performing an optimization operation is carried out by performing an optimization operation selected from the group consisting of a limit 1, limit infinity solver, a bounded least squares solver and a bounded limit 1, limit infinity solver.

12. The method of claim 7 wherein the intrinsic image comprises one of a material image and an illumination image.

13. A computer system which comprises:
a CPU; and
a memory storing an image file containing an image;
the CPU arranged and configured to execute a routine to perform a routine to generate spatio-spectral operators for the image, define a constraint between the spatio-spectral operators, and perform an optimization operation as a function of the constraint to generate an intrinsic image corresponding to the image, the intrinsic image comprising a representation of one of material or illumination, expressed as a separate, multi-band representation for the one of material or illumination, independent of the other of the material or illumination, wherein each band corresponds to a segment of the electro-magnetic spectrum.

14. A computer system which comprises:
a CPU; and
a memory storing an image file containing an image;
the CPU arranged and configured to execute a routine to perform a routine to organize spatio-spectral information for the image in a matrix equation expressed by: [A][x]=[b], wherein [A] expresses values determined by a constraining relationship imposed upon the spatio-spectral information, [b] expresses recorded information for the image, and [x] expresses an unknown material/illumination component of the image, perform an optimization operation to determine a solution for the equation, and utilize the solution to generate an intrinsic image corresponding to the image.

15. A computer system comprising:
a memory storing an image file containing an image;
a constraint generator library storing a plurality of constraint software modules, each one of the constraint software modules defining spatio-spectral information utilized by the respective one of the constraint software modules and an expression of a constraining relationship imposed upon the respective spatio-spectral information;
a service provider; and
a solver; wherein:
the service provider operates to select a constraint software module from the plurality of constraint software modules, arrange spatio-spectral information relevant to the image as a function of the selected constraint software module, and input the arranged spatio-spectral information relevant to the image to the solver, the solver operates to perform an optimization operation as a function of the arranged spatio-spectral information relevant to the image, to generate an intrinsic image corresponding to the image.

16. The computer system of claim 15, further comprising an operator cache for storing spatio-spectral information defined by the plurality of constraint software modules.

17. The computer system of claim 15 further comprising a GUI for a user input; the service provider operates to select a constraint software module as a function of the user input.

18. The computer system of claim 15 wherein the arranged spatio-spectral information relevant to the image comprises a matrix equation expressed by:
[A][x]=[b], wherein [A] expresses values determined by a constraining relationship imposed upon the spatio-spectral information, [b] expresses recorded information for the image, and [x] expresses an unknown material/illumination component of the image.

19. An automated, computerized method for processing an image, comprising the steps of:
providing an image;
generating spatio-spectral information for the image;
defining a constraint as a function of the spatio-spectral information; and
performing an optimization operation as a function of the constraint to generate an intrinsic image corresponding to the image, the intrinsic image comprising a representation of one of material or illumination, expressed as a separate, multi-band representation for the one of material or illumination, independent of the other of the material or illumination, wherein each band corresponds to a segment of the electro-magnetic spectrum.

20. An automated, computerized method for processing an image, comprising the steps of:
providing an image;
generating spatio-spectral information for the image;
defining a constraint as a function of the spatio-spectral information, wherein the constraint comprises a constraint selected from the group consisting of an absolute material color constraint, a same material constraint and a relative reflectance constraint; and
performing an optimization operation as a function of the constraint to generate an intrinsic image corresponding to the image.

21. An automated, computerized method for processing an image, comprising the steps of:
providing an image;
generating spatio-spectral information for the image, wherein the spatio-spectral information for the image comprises an operator selected from the group consisting of tokens, token map information, log chromaticity representation values, X-junctions, BIDR model representations, textons, and combinations thereof;
defining a constraint as a function of the spatio-spectral information; and
performing an optimization operation as a function of the constraint to generate an intrinsic image corresponding to the image.

22. A computer system which comprises:
a CPU; and
a memory storing an image file containing an image;
the CPU arranged and configured to execute a routine to generate spatio-spectral information for the image, define a constraint as a function of the spatio-spectral information, and perform an optimization operation as a function of the constraint to generate an intrinsic image corresponding to the image, the intrinsic image comprising a representation of one of material or illumination, expressed as a separate, multi-band representation for the one of material or illumination, independent of the other of the material or illumination, wherein each band corresponds to a segment of the electro-magnetic spectrum.

23. An automated, computerized method for processing an image, comprising the steps of:
provide an image;
generating spatio-spectral information for the image;
defining a set of constraints as a function of the spatio-spectral information; and
performing an optimization operation as a function of the constraints, wherein individual ones of the set of constraints are weighted relative to one another, in the optimization operation, according to preselected factors, to generate an intrinsic image corresponding to the image, wherein the preselected factors are selected from a group consisting of perceived importance of the respective ones of the constraints, strength, an empirically determined confidence level and combinations thereof.

24. A computer program product, disposed on a non-transitory computer readable media, the product including computer executable process steps operable to control a computer to: provide an image file depicting an image, in a computer memory, generate spatio-spectral information for the image, define a constraint as a function of the spatio-spectral information, and perform an optimization operation as a function of the constraint to generate an intrinsic image corresponding to the image, the intrinsic image comprising a representation of one of material or illumination, expressed as a separate, multi-band representation for the one of material or illumination, independent of the other of the material or illumination, wherein each band corresponds to a segment of the electro-magnetic spectrum.

* * * * *